US012067664B2

(12) United States Patent
Azhand et al.

(10) Patent No.: US 12,067,664 B2
(45) Date of Patent: Aug. 20, 2024

(54) SYSTEM AND METHOD FOR MATCHING A TEST FRAME SEQUENCE WITH A REFERENCE FRAME SEQUENCE

(71) Applicant: Lindera GMBH, Berlin (DE)

(72) Inventors: Arash Azhand, Berlin (DE); Punjal Agarwal, Berlin (DE)

(73) Assignee: Lindera GmbH, Berlin (DE)

( * ) Notice: Subject to any disclaimer, the term of this patent is extended or adjusted under 35 U.S.C. 154(b) by 9 days.

(21) Appl. No.: 17/653,057

(22) Filed: Mar. 1, 2022

(65) Prior Publication Data

US 2022/0284652 A1 Sep. 8, 2022

(30) Foreign Application Priority Data

Mar. 3, 2021 (EP) .................................... 21160408

(51) Int. Cl.
*G06T 13/80* (2011.01)
*G06F 3/01* (2006.01)
(Continued)

(52) U.S. Cl.
CPC .............. *G06T 13/80* (2013.01); *G06F 3/017* (2013.01); *G06T 7/20* (2013.01); *G06V 40/23* (2022.01);
(Continued)

(58) Field of Classification Search
CPC ........... G06V 40/23; G06F 3/017; G06T 7/20; G06T 19/00; G06T 17/00; G06T 15/10;
(Continued)

(56) References Cited

U.S. PATENT DOCUMENTS

2020/0279428 A1* 9/2020 Guay ...................... G06T 13/40
2021/0275107 A1* 9/2021 Pitters .................... G16H 50/20
(Continued)

FOREIGN PATENT DOCUMENTS

EP 4053736 A1 * 9/2022 ............. G06F 3/017

OTHER PUBLICATIONS

Liao; Yalin; A review of computational approaches for evaluation of rehabilitation exercises; Oct. 6, 2019 (Year: 2019).*
(Continued)

*Primary Examiner* — Yingchun He
(74) *Attorney, Agent, or Firm* — Brake Hughes Bellermann LLP

(57) ABSTRACT

A pose data file may represent, for each frame of a reference frame sequence, a plurality of two-dimensional skeleton projections on a virtual spherical surface, each of which, for a particular frame, corresponds to a two-dimensional reference pose image of a three-dimensional skeleton of a first human from a viewing angle. A real-time two-dimensional skeleton detector module detects a two-dimensional skeleton of a second human in each received test frame of a test frame sequence. A pose matching module selects a particular two-dimensional skeleton projection of the first human with the minimum mathematical distance from the two-dimensional skeleton of the second human in the current test frame to match the current pose of the second human in the current test frame with a corresponding reference pose image of the pose data file. The particular two-dimensional skeleton projection represents the corresponding reference pose image at the viewing angle.

16 Claims, 11 Drawing Sheets

(51) Int. Cl.
*G06T 7/20* (2017.01)
*G06V 40/20* (2022.01)

(52) U.S. Cl.
CPC ............... *G06T 2207/20081* (2013.01); *G06T 2207/20084* (2013.01)

(58) Field of Classification Search
CPC ......... G06T 15/00; G06T 13/40; G06T 13/00; G06T 13/80; G06T 13/20; A63F 13/10; A63F 2300/6607
See application file for complete search history.

(56) References Cited

U.S. PATENT DOCUMENTS

2021/0279428 A1* 9/2021 Spurr ...................... G06T 13/40
2022/0284652 A1* 9/2022 Azhand .................. G06V 20/20

OTHER PUBLICATIONS

Kia; Lu; View Invariant Human Action Recognition Using Histograms of 3D Joints; Jul. 16, 2012 (Year: 2012).*
European Search Report for Application No. 21160408.7, mailed on Aug. 6, 2021, 10 pages.
Y. Liao et al.: "A Review of Computational Approaches for Evaluation of Rehabilitation Exercises", Computers in Biology and Medicine, vol. 119, Mar. 4, 2020, 15 pages.
L. Xia et al.: "View Invariant Human Action Recognition Using Histograms of 3D Joints", Computer Vision and Pattern Recognition workshops (CVPRW), 2012 IEEE Computer Society Conference on, IEEE, Jun. 16, 2012, pp. 20-27.

* cited by examiner

SYSTEM AND METHOD FOR MATCHING A TEST FRAME SEQUENCE WITH A REFERENCE FRAME SEQUENCE

CROSS-REFERENCE TO RELATED APPLICATION

This application claims priority to EP Patent Application No. 21160408.7, filed on Mar. 3, 2021 and entitled "System and method for matching a test frame sequence with a reference frame sequence," the disclosure of which is hereby incorporated by reference in its entirety.

TECHNICAL FIELD

The present description generally relates to electronic data processing, and more particularly, relates to computer-implemented methods, computer program products and systems for matching a test frame sequence showing a user performing a physical exercise with a corresponding reference frame sequence.

BACKGROUND

Performing physical exercises in general promotes the health of the human musculoskeletal system and typically improves the fitness of an individual. Physiotherapeutic measures to help patients regaining their full mobility after an accident, surgery, a slipped disc or the like, often include dedicated physical exercises which need to be correctly performed by the patient. If not being correctly performed, such exercises may even harm the health of the patient.

While in medical treatment sessions an experienced physiotherapist or trainer can observe the patient during the performance of an exercise, and provide instructions on how to correctly perform the exercise, this is not possible when the patient is performing the exercise at home without supervision by the physiotherapist or trainer. Typically, it is highly advantageous to repeat the exercise regularly between medical treatment sessions for achieving a sustainable improvement of the medical state of the patient.

There are commercial applications available which provide instruction videos to a user showing the correct performance of exercises by an instructor. However, either the user does not receive feedback if the exercise is correctly performed or not (as it would be in a medical treatment session) in which case the user's health may even deteriorate when the exercise is performed in an incorrect manner, or complex hardware devices are required, such as for example the VAHA mirror from etone Motion Analysis GmbH, 10587 Berlin, Germany, or the PIXFORMANCE mirror offered by Pixformance Sports GmbH, 14624 Dallgow-Doberitz, Germany which also includes a depth sensor. Such hardware mirror solutions include large devices which require a complex setup procedure. After the setup, they need to be operated at a fixed location.

SUMMARY

There is therefore a need for an application which can provide instructions to a user in such a way that damage to the user's health is prevented by ensuring correct execution of a physical exercise during unsupervised training without a need for particular complex hardware devices. This is achieved by providing an application which allows to identify deviations in the performance of the exercise by said user being captured by a test frame sequence of a video from a reference frame sequence showing an instructor performing the correct sequence in accordance with the embodiments depicted in the independent claims.

Thereby, a further technical problem is addressed by said embodiments. When trying to match the test frame sequence with the reference frame sequence, it is typically required that the camera for capturing the test frame sequence is positioned in the same way (i.e., under the same viewing angle) as the camera which was used for capturing the test frame sequence. In a home environment this can be challenging—in particular in situations where a simple smartphone or tablet with an integrated camera is used to capture the test frame sequence. Typically, such devices cannot easily be installed at a respective location. Sometimes even the location where the user performs the exercise may not allow for such a positioning. There is therefore a need to provide an application which can match a test frame sequence with a reference frame sequence in a manner which is agnostic to the viewing angle of the camera towards the user when capturing the performance of the exercise by said user.

This technical problem is solved by the embodiments—a computer-implemented method, a computer program product, and a computer system in accordance with the independent claims—for matching a test frame sequence showing the user (while performing said physical exercise) with a corresponding reference frame sequence (demonstrating the correct performance of the physical exercise by a trainer/instructor).

A computer system which loads a respective computer program product into its memory, and which processes the loaded computer program with one or more processors is thereby configured to perform the computer-implemented method as described in the following.

The computer system has an interface adapted to receive a pose data file. For example, the pose data file may be loaded from a data carrier such as a DVD or USB device, or it may be retrieved from a remote storage device (e.g., a server accessible via the Internet). The pose data file is based on lists of three-dimensional joint coordinates (one list for each characteristic frame of the reference video) representing positions of a plurality of joints of the three-dimensional skeleton of a first human (the trainer/instructor) in the respective frame. Such 3D joint coordinates can be obtained from the reference video, for example, by using the technology described in the publication "VNect: Real-time 3D Human Pose Estimation with a Single RGB Camera" by DUSHYANT MEHTA et al., Journal ACM Transactions on Graphics, Volume 36 Issue 4, July 2017, Article No. 44. This paper describes in detail an implementation example of the CNN which is based on the ResNet50 network architecture of He et al. in "Deep Residual Learning for Image Recognition", IEEE Conference on Computer Vision and Pattern Recognition, 2016. European patent EP3656302 describes in detail how three-dimensional gait information can be extracted from an obtained video stream by using the above method or other methods like the SMPLify approach (cf., "Keep it SMPL: Automatic Estimation of 3D Human Pose and Shape from a Single Image", by Federica Bogo et al., obtainable at http://files.is.tue.mpg.de/black/papers/BogoECCV2016.pdf).

For at least a subset of frames—the characteristic frames—of the reference frame sequence, based on the respective list of 3D joint coordinates, a plurality of two-dimensional skeleton projections on a virtual spherical surface is stored in the pose data file. This subset of frames (i.e., the characteristic frames) comprises one or more frames with characteristic poses of the physical exercise (i.e., poses which clearly allow to characterize the physical exercise such that the physical exercise can be distinguished from other exercises based on such poses). For example, a subset of characteristic poses for performing squats may include a first characteristic frame showing a pose where the first human is in the squat, and a second characteristic frame where the first human is in an upright position. Thereby, a particular joint is placed at the geometric center of each spherical surface. Typically, the pelvis of the first human is used as this particular center joint. In other words, each two-dimensional skeleton projection on a particular virtual sphere for a particular frame corresponds to a two-dimensional reference pose image of the three-dimensional skeleton of the first human at the respective point in time from a different viewing angle. In a first implementation, different concentric virtual spheres may be used with different radii reflecting different (physical) distances of the 2D skeleton projections from the 3D center joint. In a second implementation, a single virtual sphere is used with a normalized radius. In this implementation the (physical) distance between camera and user becomes irrelevant. Details regarding the two implementations are given in the detailed description. For example, 2D projections on a particular spherical surface where the pelvis is on the equator line of said sphere corresponds to a camera viewing angle where the camera would be operated at a height above ground which corresponds to the height of the pelvis. The projections on the equator line reflect any viewing angle from 0 to 360 degrees around the first human. For example, the 2D projections may be computed with a resolution of one projection per 1 degree. Of course, other resolutions may be chosen. 2D projections with the pelvis in the upper half of the sphere correspond to situations where the camera is positioned at a location higher than the first human's pelvis. 2D projections with the pelvis in the lower half of the sphere correspond to situations where the camera is positioned at a location lower than the first human's pelvis. Thereby, 2D projections which correspond to a camera position below the ground are of course of no practical relevance as in a real-world scenario the camera cannot be positioned below ground in the user's exercising environment.

In the first implementation, for a given projection (i.e., viewing) angle, the projections on the various concentric spherical surfaces with different radii reflect different distances between the first human and the camera. A projection on one of the outer spheres results in a smaller skeleton image than a projection on the inner spheres of the plurality of concentric spheres. A bigger projection image corresponds to a smaller distance between the hypothetical cameras and the first human than a smaller projection image. It is thereby not relevant which real-world distance between a user and the camera is associated with the respective projection image size. It is only relevant, that the totality of all projection sizes in the different spheres cover a distance range which includes the distance between a camera and a user when the camera is used to capture a video of the user while performing an exercise. In other words, a realistic distance range to be covered by the 2D projections is between 2 and 10 meters. The detailed description describes in detail how to derive the 2D projections from the lists of 3D joint coordinates to arrive at the pose data file which then serves as input to the computer system.

In the second implementation, only a single spherical surface is used which has a normalized radius. That is, for each 2D skeleton projection the joint coordinates are normalized such that the respective x, y coordinates are between 0 and 1. This implementation takes advantage of the fact that the proportions between the various body parts stay invariant when watching a particular pose from a certain angle—no matter from which distance. That is, independent of the real distance between camera and user, the normalized 2D projection on a single virtual sphere at a particular angle is invariant.

Further, the computer system has an interface which is configured to receive the test frame sequence representing movements of a second human (the user) while imitating the physical exercise. Imitating the physical exercise means that the second human tries to perform the physical exercise in real time in the same way as the first human is demonstrating the physical exercise in the reference frame sequence. Interface technology for real-time reception of a video stream from a camera device is well known in the art. Thereby, the user has placed the camera at an arbitrary viewing angle to capture the test frame sequence while the user performs the exercise. Typically, the user is watching the reference video while performing the exercise. However, this is not a requirement. For example, the user may have already learned by heart how to perform the physical exercise. In this case it may not be necessary that the user still watches the reference video while performing the exercise. Nevertheless, the following steps of said computer-implemented method can still be performed.

The system further has a real-time 2D skeleton detector configured to detect the two-dimensional skeleton of the second human in each received test frame of the test frame sequence. Real-time as used herein, describes a near-real-time system response in that a computation in response to a received input is only delayed by the time delay introduced, by automated data processing or network transmission, between the occurrence of an event and the use of the processed data, such as for display or feedback and control purposes. For example, a near-real-time display depicts an event or situation as it existed at the current time minus the processing time, as nearly the time of the live event. Thereby, the 2D skeleton of the second human is a two-dimensional representation of the pose of the second human in the respective test frame. Real-time 2D skeleton detectors which can compute a 2D skeleton of a user in near real-time from a video of this user are known in the art. For example, one implementation is disclosed in the European patent EP3656302. Other implementations are commercially available, such as for example the 2D tracker from Kaia Health Software GmbH, 80803 Munchen, Germany. A near-real-time system response, as used herein, means that the computation of the 2D skeleton is only delayed by the time delay introduced (by automated data processing or network transmission) between the occurrence of an event (e.g., receipt of a video frame) and the use of the processed data (e.g., use of the computed 2D data by a further application ora user.) For example, a near-real-time display depicts an event or situation as it existed at the current time minus the processing time, as nearly the time of the live event. For example, the current test frame including a representation of the corresponding two-dimensional skeleton of the second human may be visualized to the second human in near-real-time. In case the camera for capturing the second human is the front camera of a smartphone or tablet computer, the visualization of the detected 2D skeleton as an overlay to the respective test frame may be rendered on the display of the smartphone or table computer. This way, only a single device is needed for capturing the test frames and displaying any resulting information to the second user. In an alternative set-up the display device may be a separate device. For example, a computer or TV screen may be used for the display whereas a webcam mounted on top of that screen may be used for capturing the exercising human.

In case the first implementation with concentric spherical surfaces is used, the detected 2D skeleton is directly provided as input to a pose matching module. In case the second implementation with a normalized spherical surface is used, the detected 2D skeleton is normalized before being provided as input to a pose matching module. That is, the detected or normalized 2D skeleton is then provided as input to the pose matching module of the computer system which is configured to select a particular two-dimensional skeleton projection of the first human with the minimum mathematical distance to the two-dimensional skeleton of the second human in the current test frame to match the current pose of the second human in the current test frame with a corresponding reference pose image of the pose data file. Thereby, the particular two-dimensional skeleton projection represents the corresponding reference pose image at a viewing angle which corresponds to the particular angle of the camera device. In other words, the pose matching module compares the identified 2D skeleton (associated with the second human) of the current test frame with the 2D skeleton projections of the reference video (associated with the first human). Thereby, the pose matching module estimates the mathematical distance between the identified 2D skeleton and the 2D skeleton projections on the concentric spheres or, in case of the second implementation, with the normalized sphere (e.g., by computing the Euclidean distance between corresponding joints or by using a correspondingly trained neural network). It is to be noted that such distance computations can also be performed in near-real-time. Thereby, the second implementation requires a reduced computation time for the distance computation in comparison with the first implementation, because the search space for appropriate 2D projections is reduced from a set of 2D projections on a plurality of concentric spheres to a set of 2D projections on a single normalized sphere by eliminating the distance dimension (i.e., by using normalized joint coordinates reflecting proportions between body parts rather than using absolute distance measures between the respective joints). The pose matching module finally selects the 2D projection which has the minimum distance to the identified 2D skeleton. As a result, the selected 2D skeleton projection represents a pose image of the reference video which comes closest to the pose performed by the second human in the current frame for which the respective 2D skeleton had been identified by the skeleton detector. This implies, that the viewing angle of the camera which is used for capturing the test frame sequence corresponds approximately to the viewing angle associated with a hypothetical camera position associated with the selected 2D skeleton projection. The real distance between the camera and the user plays no further role. It is to be noted that, in an embodiment where the pose data file includes 2D projections for all frames of reference frame sequence, each test frame of the test frame sequence can result in a positive matching result with a respective 2D projection on the virtual sphere(s), whereas, in an embodiment where the pose data file includes 2D projections only for a subset of characteristic frames, a positive matching result can only be provided for such (current) test frames where the user is taking a pose that corresponds to a characterizing pose of the exercise in one of the characterizing reference frames.

In one embodiment, the selection of the 2D projection having the minimum mathematical distance to the identified 2D skeleton can be made by a correspondingly trained neural network. For example, a standard multilayer perceptron may be trained in the following way to be enabled to make such selection in near-real-time. A set of videos showing users in different poses while doing exercises is used as a basic dataset. Such videos can be obtained, for example, from the so-called CMU Panoptic Dataset. The previously described 2D projection algorithm is then applied to such videos to produce corresponding 2D skeleton projections for each frame of the subset of frames which is flagged as being characteristic for the exercise. For example, the corresponding flags for characteristic frames may be set by a user annotating the reference frame sequence accordingly. For each pose projection the vector with the respective polar coordinates (r, $\phi$, $\theta$) is thereby known and can now be used as label for the respective 2D projection. The neural network is then trained with the 2D skeleton projections as input to predict (r, $\phi$, $\theta$) for any 2D pose, wherein the respective labels provide the ground truth for the training. Once the neural network is sufficiently trained, it can predict, in near-real-time, the (r, $\phi$, $\theta$) vector which corresponds to any 2D skeleton identified by the real-time 2D skeleton detector. The predicted (r, $\phi$, $\theta$) vector points directly to the 2D skeleton projection of the reference video stream which is estimated (by the neural network) to have the minimum mathematical distance to the pose in the current test frame. In other words, the neural network selects in real-time the 2D projection at a viewing angle which comes closest to the viewing angle between the user and the camera obtaining the test frame sequence. This embodiment is also advantageous in that it can immediately adapt automatically to any position change of the user while performing the exercise. The neural network immediately selects the 2D projections of the reference video stream which provide the best match with current pose at a changed location or viewing perspective (if the user just slightly changes the viewing direction). The viewing perspective describes the polar coordinates of a camera in relation to the user being captured by said camera. That is, the viewing perspective is described by the distance r between the user and the camera, as well as the viewing angle (as defined by the azimuthal angle $\phi$ and polar angle $\theta$).

As a consequence, the sequence of 2D skeleton projections associated with said hypothetical camera position represents a reference video stream with frame images that are directly comparable with the frame images of the test frame sequence. That is, this selected reference video stream provides an ideal basis for matching the poses performed by the second human while performing the physical exercise with the poses of the first human in the reference video. Such pose matching provides the basis for a more detailed analysis to identify pose deviations of the second human from the corresponding poses of the trainer/instructor which may harm the second human's health. It is advantageous that the pose matching can be performed by the claimed embodiments based on a video stream of a standard RGB camera device capturing the test frame sequence of the exercising second human. No complex video equipment with cameras having depth sensors or the like is required. Further, it is advantageous that the camera for capturing the exercising second human can be positioned under any viewing angle in the exercising environment of the second human at a flexible distance. For the first implementation using concentric virtual spheres, the distance can be flexible within a predefined distance range. For the second implementation using a normalized sphere, the distance plays no role and the camera can be placed at any distance in the exercising room of the user. That is, the proposed pose matching is viewing-angleagnostic and distance-agnostic in that the pose matching component always finds an appropriate 2D skeleton projection with a minimum mathematical distance to the identified 2D skeleton of the second human in a test frame which is captured by the respective camera under at an arbitrary viewing angle. In other words, the desired pose matching effect is achieved independent of the actual camera setup with regard to viewing angle and physical distance between camera and user. The selected 2D projection frame sequence can then serve as reference pose images for the pose analyses as described in the following.

The computer system which is configured as described above is technically enabled to perform a near-real-time analysis of the test frame sequence to assess whether the second human is correctly performing the exercise or whether there is a risk of negatively affecting the second human's health because of wrong exercise execution. In the latter, the system can even provide instructions to the second user on how to improve the exercising to prevent potential health damage.

To achieve this effect, in one embodiment, the computer system further includes a pose checking module which is configured to determine a distance of the current pose of the second human from the corresponding reference pose in the selected 2D skeleton projection frame sequence. Thereby, the distance is a measure indicating whether the second human is correctly performing the physical exercise. In other words, if the distance between joints in the identified 2D skeleton and corresponding joints in the selected 2D skeleton projection exceeds one or more corresponding predefined threshold values, the exercise is not correctly performed by the second human. The one or more predefined threshold values correspond to tolerances for the assessment of the correctness. Such tolerance values may be customizable by the second human. For example, elder users may use larger tolerances than younger users.

In case the physical exercise is not correctly performed by the user, the pose checking module can indicate to a pose correction feedback on how to correct the current pose. This feedback is then communicated to the user. Different modalities may be used to output the correction feedback to the user. For example, a text message with the correction feedback may be merged into the visualization of the current frame with the 2D skeleton representation. Alternatively, the text message may be output to the user as a voice instruction via a voice interface. Alternatively, a graphic correction indicator may be merged into the current frame with the 2D skeleton representation at the location(s) where the distance(s) exceed said thresholds. For example, at the respective joint location an arrow may indicate the direction in which the current pose needs to modified for correct exercise execution.

In one embodiment, the pose data file may further include annotations for each frame grouping subsets of joints to corresponding body parts. That is, all joints belonging to the right arm of the first human may be annotated with the group indicator "right arm". This can be done for each body part which is relevant to the correct performance of the exercise. Based on such annotations, the pose checking module can indicate the body parts which exceed a predefined critical distance for the current test frame. The feedback provided to the user (second human) conveys to the user how to change the current pose with regard to the indicated body parts until the current distance for said body parts falls below the critical distance. In particular when using the modalities for feedback provisioning as text messages the user can quickly (in real-time) understand how to change the current pose by following the instructions with regard to a body part rather than looking into feedback which relates to particular single joints. Alternatively, the respective body part can be highlighted in the visualization of the current frame with the 2D skeleton representation. For example, a body part with an incorrect posture may be highlighted in red and graphical indicator (e.g., an arrow) associated with the highlighted body part may indicate the correction direction.

Further aspects of the description will be realized and attained by means of the elements and combinations particularly depicted in the appended claims. It is to be understood that both, the foregoing general description and the following detailed description are exemplary and explanatory only and are not restrictive of the description as described.

SHORT DESCRIPTION OF THE FIGURES

Figure 5A:
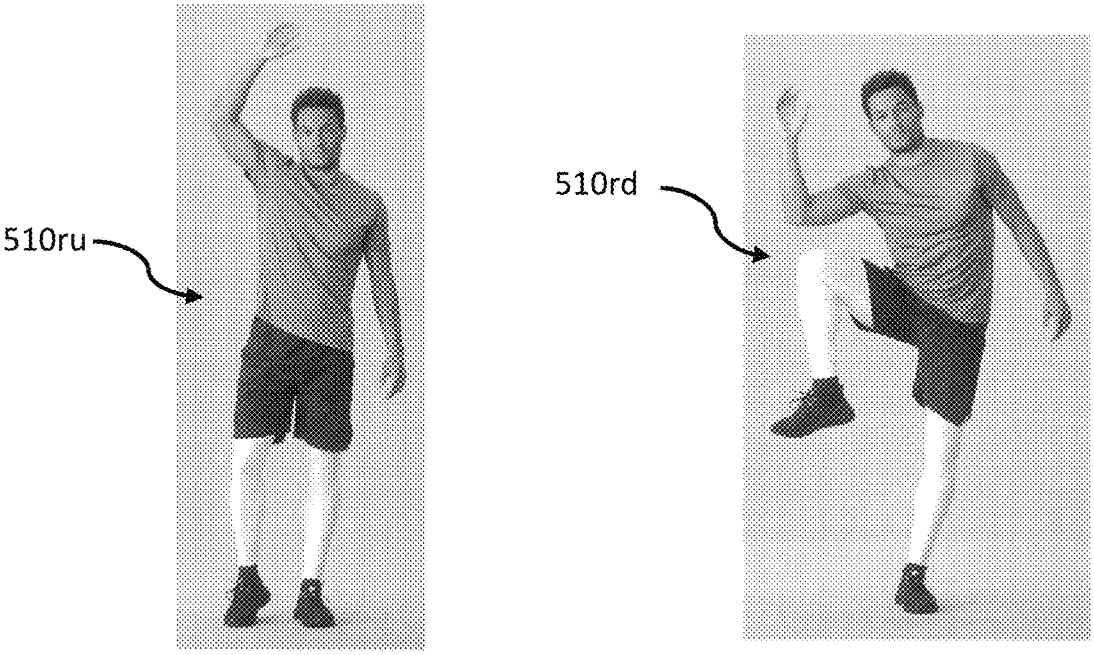
Figure 5B:
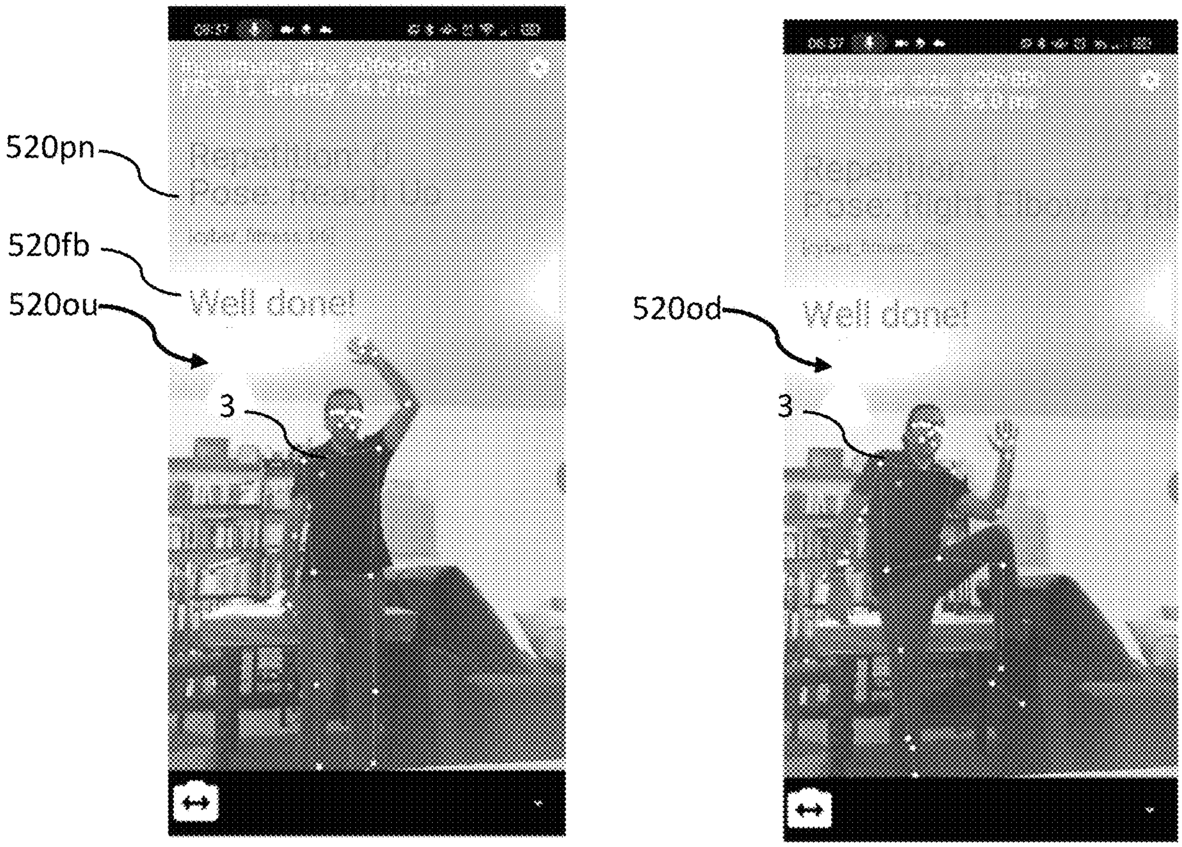
Figure 5C:
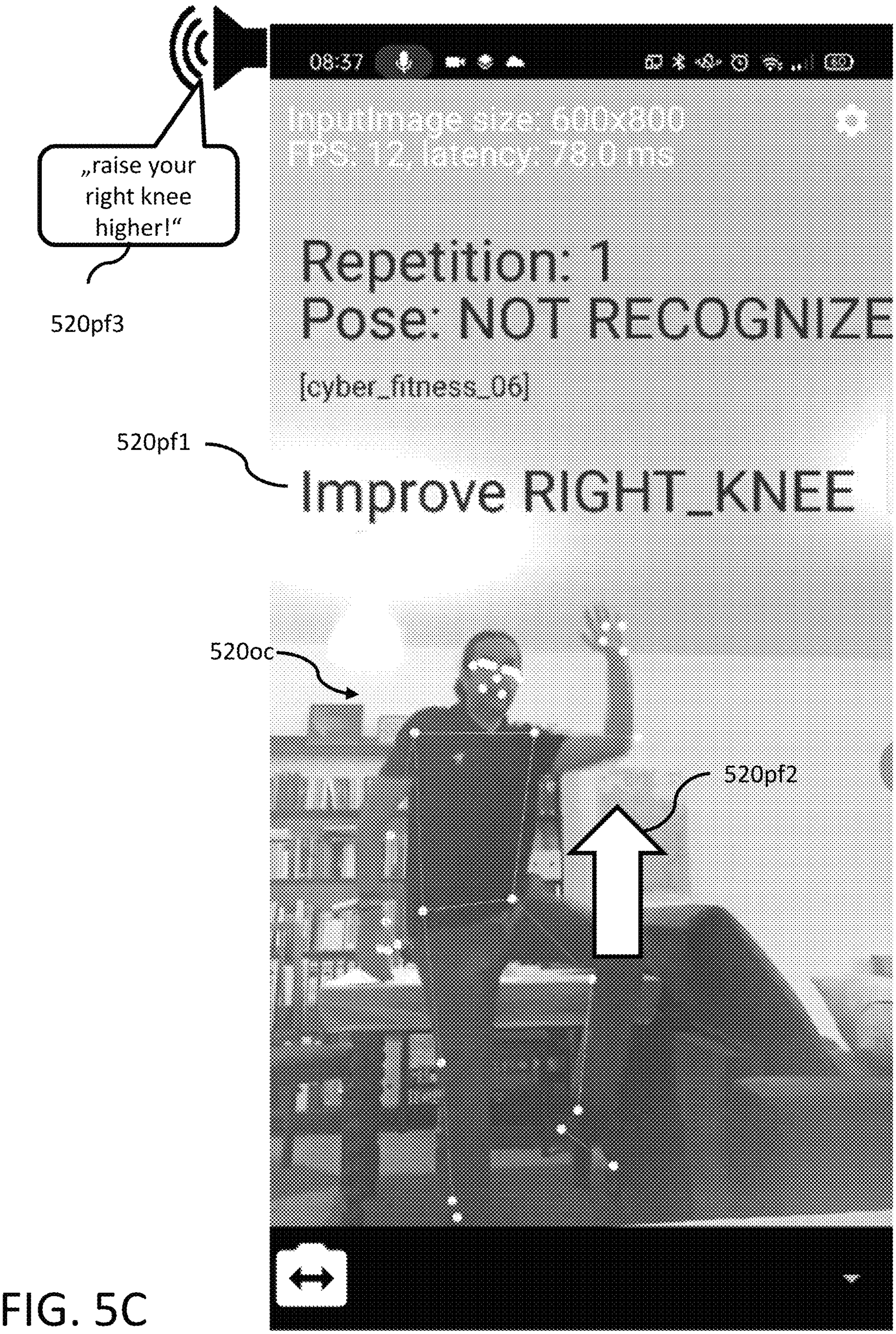
Figure 5D:
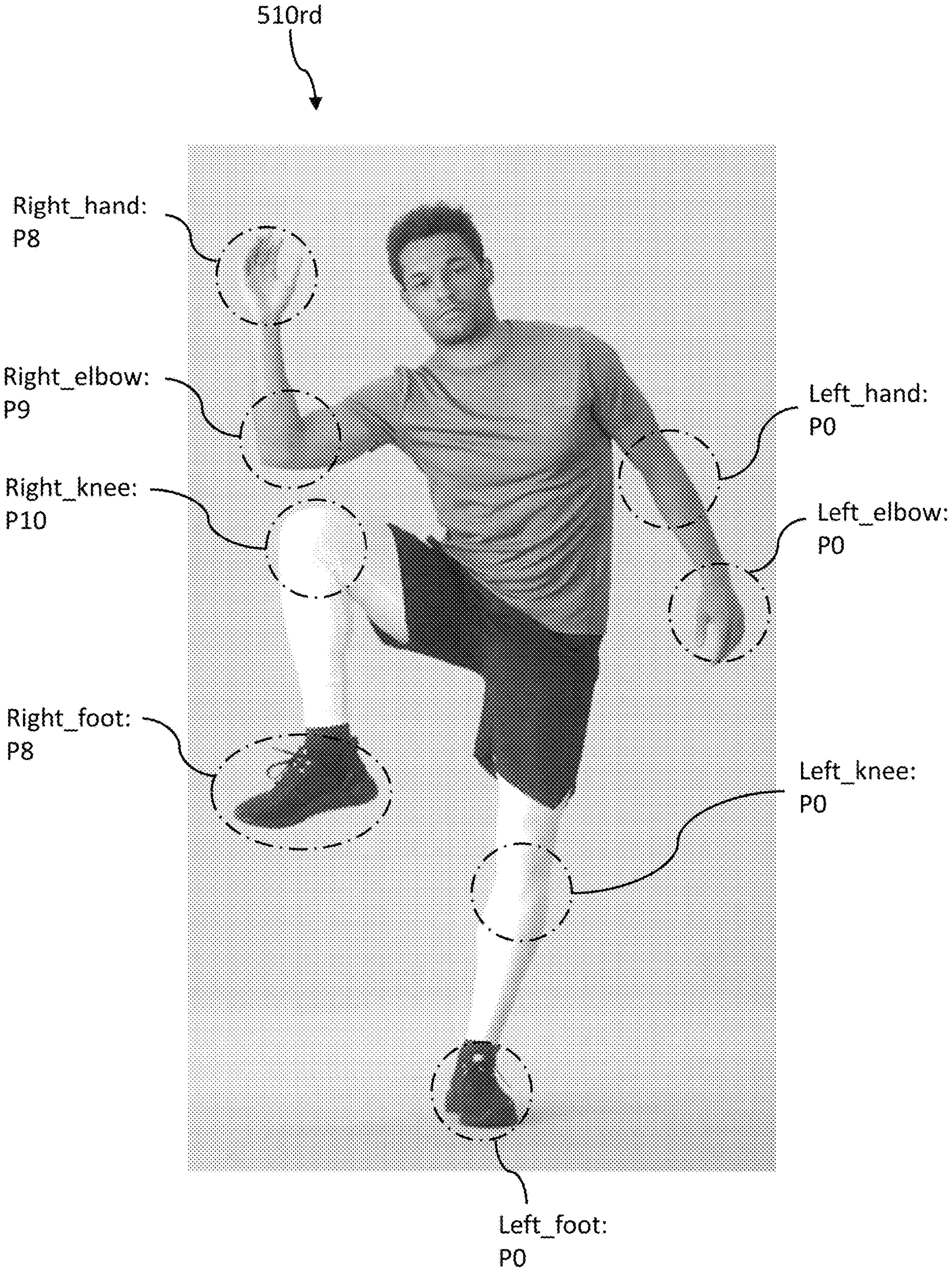
Figure 6A:
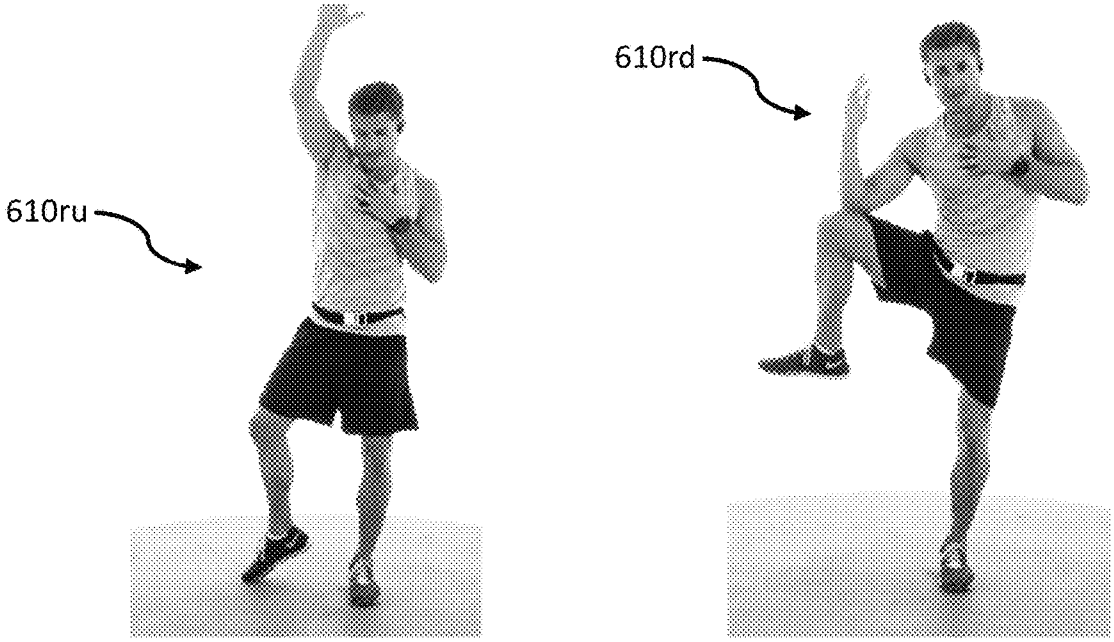
Figure 6B:
Figure 7:
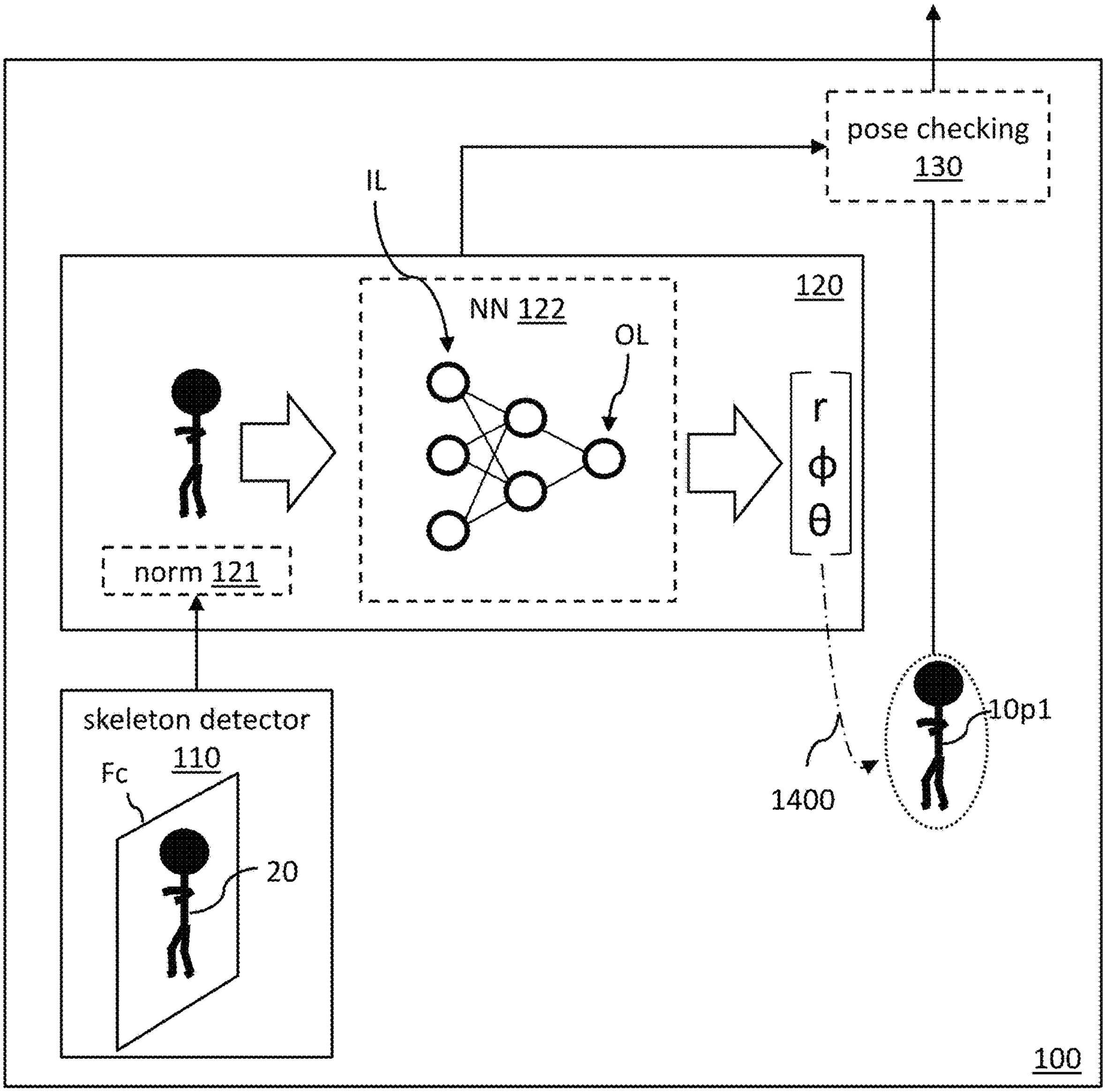
Figure 8:
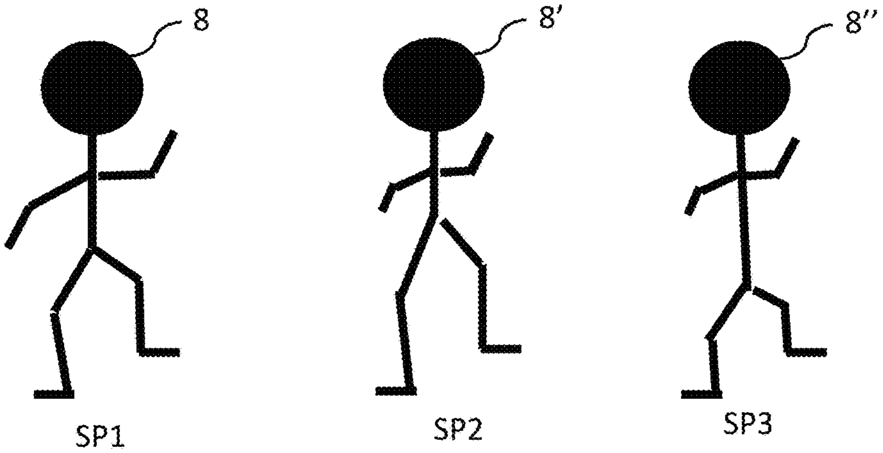
Figure 9:
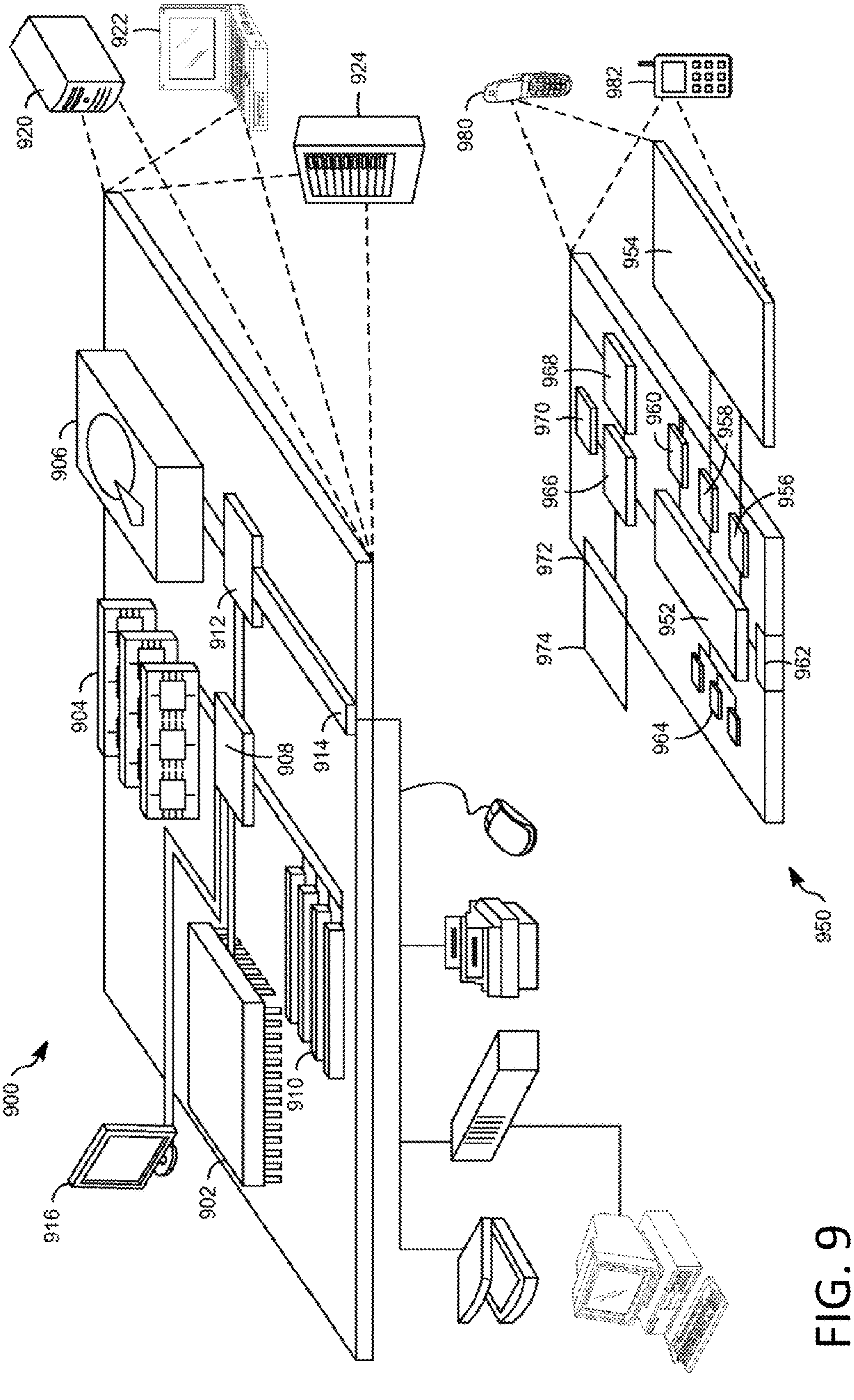

FIGS. 5A, 6A, each illustrating two frames of a reference frame sequence with a trainer performing a physical exercise;

FIGS. 5B, 5C show a user interface with a visualization of a user performing a physical exercise including feedback to the user regarding the correctness of exercise execution;

FIG. 5D shows further annotations for each reference frame with different priority for repsective body parts in the context of an exercise;

FIG. 6B shows a user interface with a visualization of a user performing a physical exercise including feedback based on priority annotations according to an embodiment;

FIG. 7 illustrates a pose matching example embodiment using a trained neural network;

FIG. 8 illustrates a data augmentation approach for training the neural network; and FIG. 9 is a diagram that shows an example of a generic computer device and a generic mobile computer device, which may be used with the techniques described herein.

DETAILED DESCRIPTION

Figure 1A:
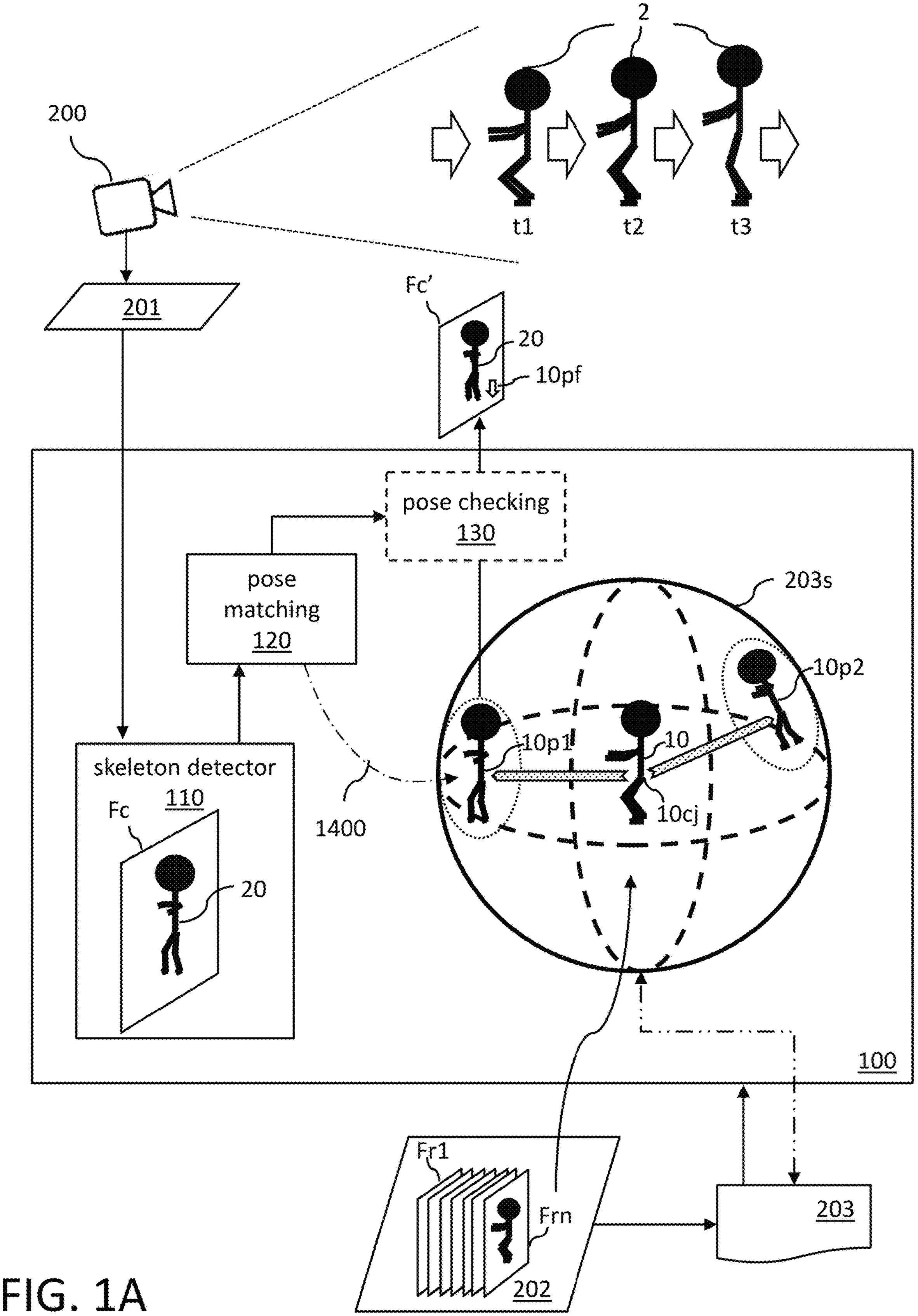
FIG. 1A illustrates a block diagram of a computer system for matching a test frame sequence capturing the performance of a physical exercise by a user with a corresponding reference frame sequence according to an embodiment.
Figure 2:
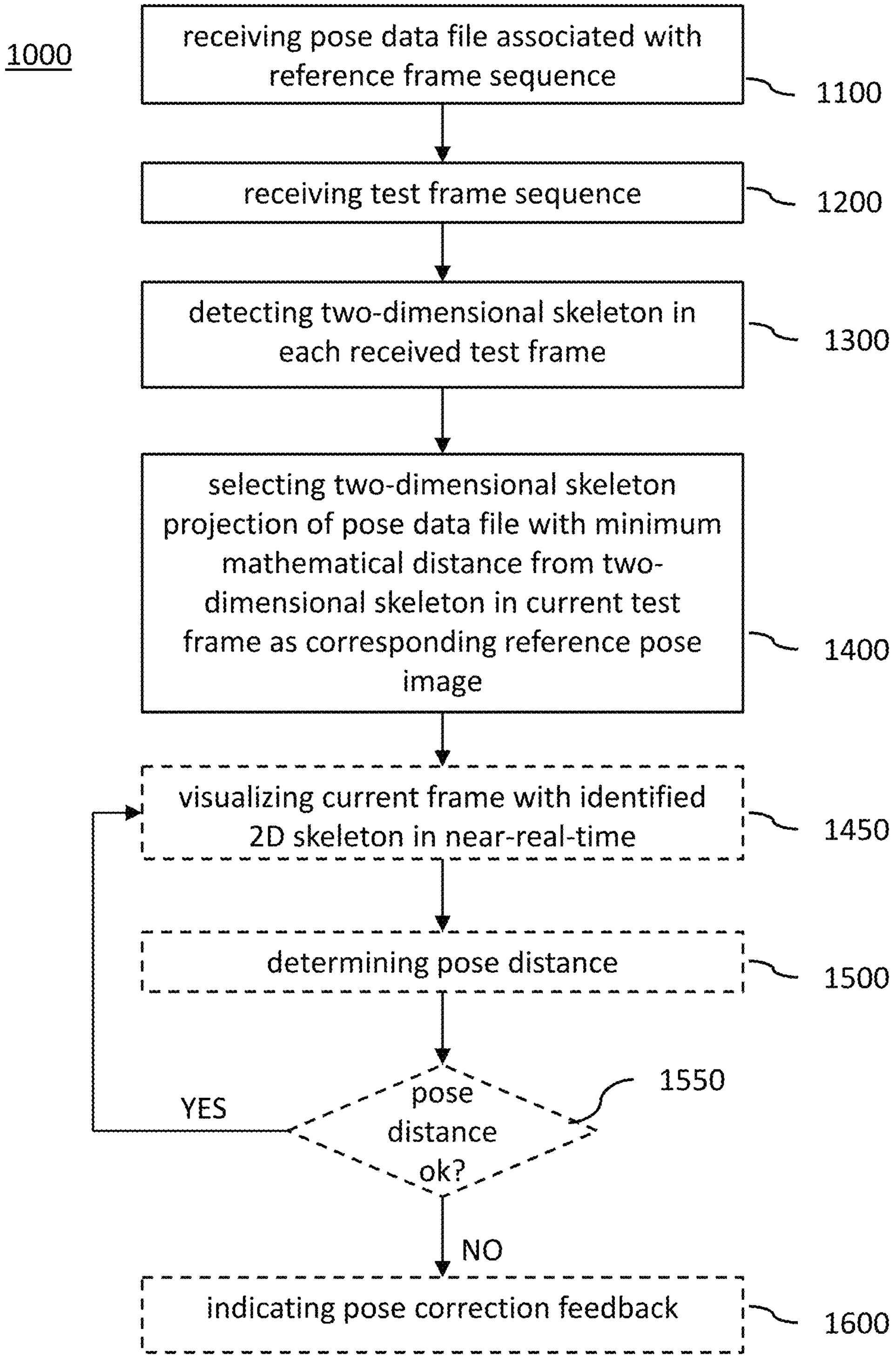
FIG. 2 is a simplified flow chart of a computer-implemented method for matching a test frame sequence capturing the performance of a physical exercise by a user with a corresponding reference frame sequence according to an embodiment.

FIG. 1A includes a block diagram of a computer system 100 for matching a test frame sequence 201 capturing the performance of a physical exercise t1-t2-t3 by a user 2 with a corresponding reference frame sequence 203 according to an embodiment. FIG. 2 is a simplified flow chart of a computer-implemented method 1000. The method 1000 can be executed by the system 100. For this reason, FIG. 1A is described in view of FIG. 2 and the following description of FIG. 1A also refers to reference numbers used in FIG. 2. It is to be noted that the sequence of the method steps in FIG. 2 is exemplary only. At least some of the steps can be executed in a different order. For example, the order of the receiving steps 1100, 1200 can be switched.

The system 100 is communicatively coupled with camera 200 which is positioned at an appropriate angle to capture the user 2 while performing the exercise t1-t2-t3. The camera is a standard RGB camera device which provides a video stream including the test frame sequence 201 as input to system 100. For example, the camera may be an integrated camera in a smartphone, notebook or tablet PC, an external webcam or the like. The reference numbers t1-t2-t3 for the exercise indicate that the user performs a movement over time (with time progressing from left to right). At time t1, the user 2 takes a first posture with bended knees from which the user continuously moves, via an intermediate posture at t2, towards an upright position at t3.

The test frame sequence 201 is received 1200 by a real-time two-dimensional skeleton detector module 110 of system 100. The real-time 2D skeleton detector detects 1300 a two-dimensional skeleton 20 of the user 2 in a particular received test frame of the test frame sequence 201. Typically, such 2D skeleton detectors can detect a 2D skeleton in each frame. However, it can also be sufficient to detect the 2D skeleton in every $n^{th}$ frame (with n=2, 3, 4, etc.) As described already in the summary section, such real-time 2D skeleton detectors are known in the art and commercially available. The two-dimensional skeleton 20 of the user 2 is a two-dimensional representation of the pose of the second human in the respective test frame. In the example, the camera is positioned in front of user2 with a slight shift to the left from the perspective of user 2. Therefore, the detected 2D skeleton shows the current pose of the user in the current frame Fc from the perspective of the camera 200.

Figure 3:
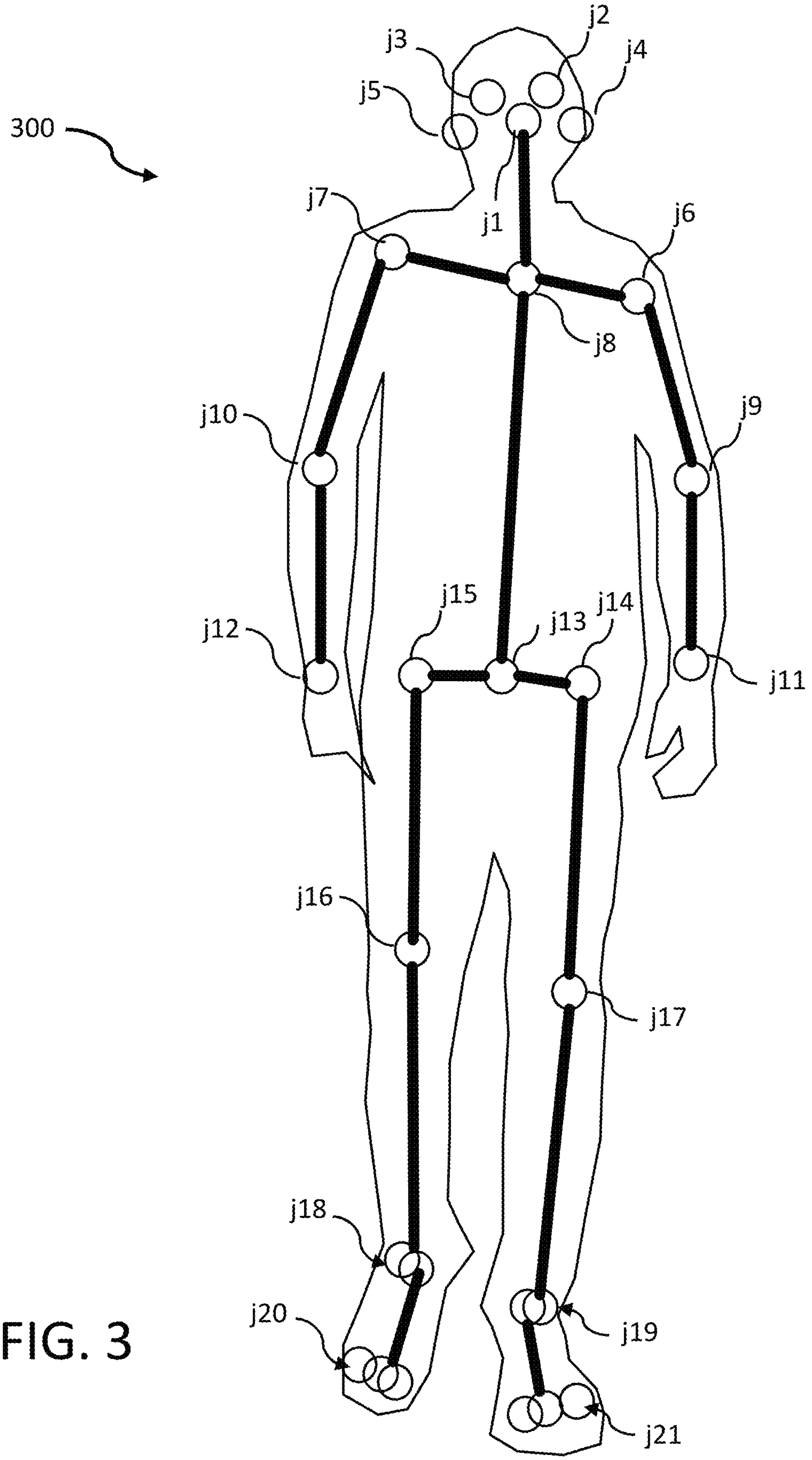
FIG. 3 illustrates the shape of a human with a two-dimensional overlay of a schematic 2D skeleton of the human.

FIG. 3 schematically illustrates such a two 2D skeleton as identified by the skeleton detector 110 within the shape of a human 300. In principle, the skeleton detector 110 detects the user's joints in a test frame (represented by circles) and connects such joints by bold connecting lines representing the user's bones. In the example of FIG. 3, the skeleton detector is further trained to identify the user's eyes j2, j3 and ears j4, j5. With regard to the 2D skeleton, the following joints may be used: nose j1, neck j8, shoulders j6, j7, elbows j9, j10, wrists j11, j12, hips j13, j14, j15 (with the mid hip j13 also referred to as pelvis), knees j16, j17, ankles j18, j19 and toes j20, j21. The bold lines between the various joints are simplified representations of the human's 300 bones. For example, the spine of the human, although consisting of a plurality of dorsal vertebra is simply represented by the connection lines j1-j8 and j8-j13.

Figure 4A:
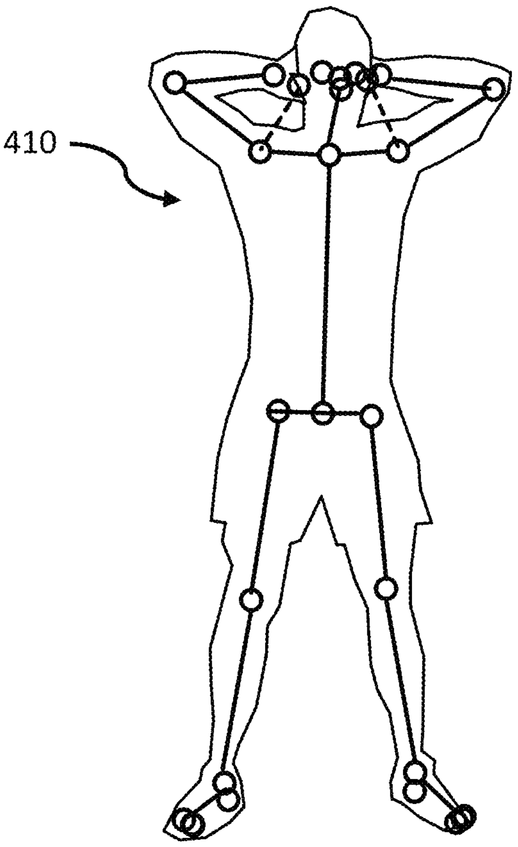
FIGS. 4A, 4B illustrate two postures of a physical exercise performed by a human with two-dimensional overlay of a schematic 2D skeleton of the human.
Figure 4A:
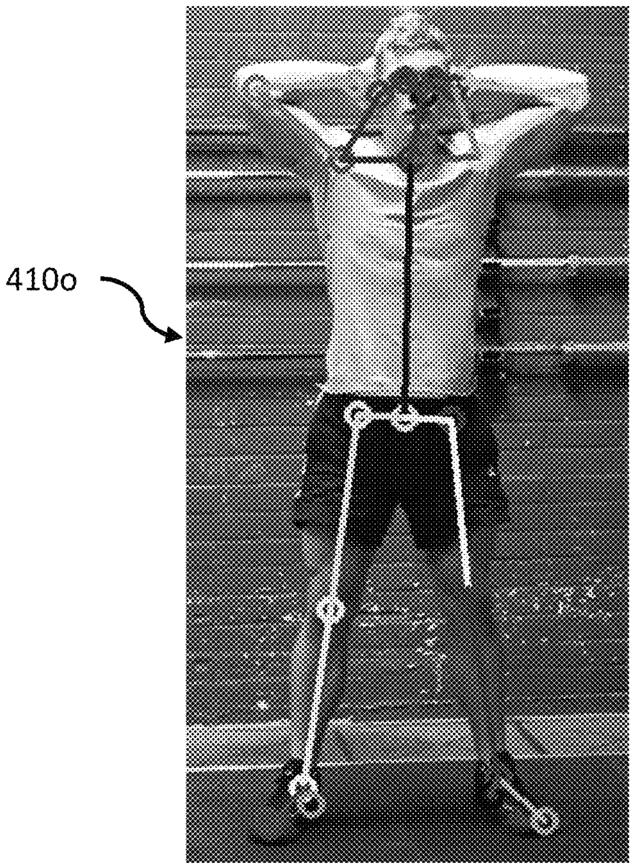
Figure 4B:
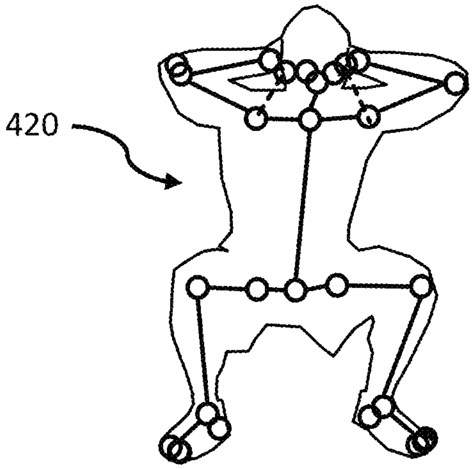
Figure 4B:
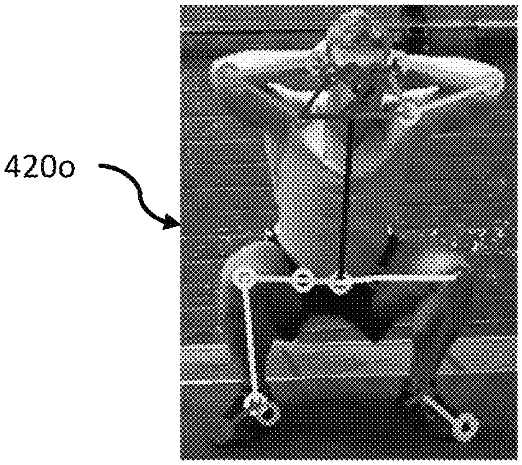

FIGS. 4A and 4B show two test frames 410*o*, 420*o* with a user performing two postures as parts of a physical exercise with the respective identified 2D skeleton as an overlay. Although there are no bones between the users shoulders and ears, the overlays in the test frames also include ear-shoulder connection lines. These lines provide valuable information about the distance between the ears and shoulders which is a good indicator of the user's head posture in the respective test frame. In the schematic drawings 410, 420 for said postures the ear-shoulder connection lines are therefore illustrated by dashed lines to distinguish them from the simplified bone representations.

The computer system further has an interface to receive 1100*a* pose data file 203 associated with a reference frame sequence 202. The reference frame sequence 202 includes frames Fr1 to Frn which show a first human (trainer/instructor) demonstrating the correct execution of the physical exercise which is to be performed by the second human 2. Of course, the reference frame sequence 202 has been recorded previously (that is, it not executed by the first human in parallel with the second human). FIG. 5A illustrates an example of two reference frames 510*ru*, 510*rd*. In frame 510*ru*, an initial pose of the physical exercise is shown where the first human (trainer) is raising the right arm. In the course of this exercise, the trainer is moving the right elbow to touch the right knee by also raising the right knee. This pose of the exercise is illustrated in the reference frame 510*rd*.

The pose data file for the entire reference frame sequence is generated based on a list of three-dimensional joint coordinates representing positions of a plurality of joints of a three-dimensional skeleton 10 of the first human in at least a subset of (characterizing) frames Fr1 to FRn of the reference frame sequence 202, and represents for each frame of the subset Fr1 to Frn of the reference frame sequence 202 a plurality of two-dimensional skeleton projections 10*p*1, 10*p*2 on a virtual spherical surface 203*s* with a particular joint 10*cj* of the first human (typically the pelvis) at the geometric center of the spherical surface 203*s*. Thereby, each two-dimensional skeleton projection 10*p*1, 10*p*2 on this virtual spherical surface for a particular reference frame corresponds to a two-dimensional reference pose image of the three-dimensional skeleton 10 of the first human from a different viewing angle. The dotted arrows between the three-dimensional skeleton 10 and the 2D skeleton projections 10*p*1, 10*p*2 represent two different viewing angles on the 3D skeleton 10. For simple exercises, where a user has to repeat moving from a start pose to a target pose and back to the start pose, the subset of characterizing frames may only include two characterizing frames—a first one with an image of the start pose and a second one with an image of the target pose. I this example, the frames representing the movement between the two poses may not necessary be reflected in the pose data file (i.e., for such frames in between 2D skeleton projections are not necessarily available in the reference frame sequence 202.

Figure 1B:
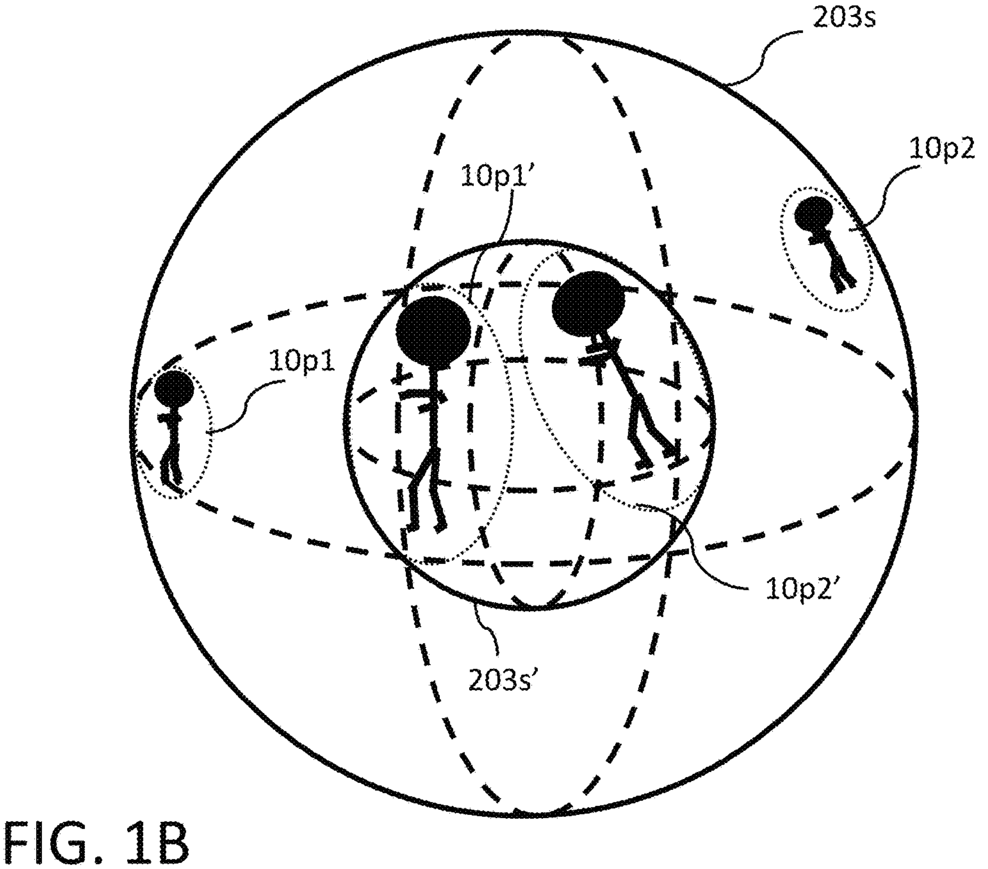
FIG. 1B illustrates concentric spherical surfaces for 2D skeleton projection according to an embodiment.

Turning briefly to FIG. 1B, an implementation using a plurality of concentric virtual spherical surfaces is illustrated. Two concentric spherical surfaces 203*s*, 203*s*' of such a plurality are shown. The sphere 203*s* has a larger radius r than sphere 203*s*'. Δr determines the distance resolution of the system. A higher density of concentric spheres leads to a higher resolution with regard to potential distances between user and camera. The 2D projection 10*p*1' on sphere 203' and the 2D projection 10*p*1 on sphere 203 reflect the same viewing angle but different distances between camera and user. Thereby, the larger projection 10*p*1' is associated with a shorter distance than the smaller projection 10*p*1. The same applies to the projections 10*p*2 and 10*p*2'. That is, assuming that a virtual camera would be installed in the center of a particular 2D projection, the size of this 2D projection is computed so that it corresponds to the image of the trainer which would be captured by this virtual camera. In other words, the distance between the virtual camera and the trainer corresponds to the radius of the respective sphere and the correct viewing angle is defined by the two angular coordinates of the virtual camera position on said sphere.

In the example of FIG. 1A, the 2D skeleton projection 10*p*1 reflects a viewing angle associated with a hypothetical camera position at a distance to the human which corresponds to the camera position of camera 200 versus the user 2 in the real-world situation of that user. The 2D skeleton projection 10*p*2 reflects a viewing angle associated with a hypothetical camera position which reflects an elevated position of the hypothetical camera (pelvis of projection 10*p*2 is in the upper half of sphere 203*s*) in the back of the trainer with a slight shift to right from the trainer's perspective.

In the following it is described how such 2D skeleton projections of the pose data file 203 are derived from the original three-dimensional skeleton 10.

A spherical coordinate system {r, ϕθ} is defined with r: Radial distance

Δ: Azimuthal angle

θ: Polar angle

It is assumed that the mid hip joint (pelvis) is at the center (0, 0, 0) of the coordinate system (e.g., geometric center of the spherical surface 203*s*). It is further assumed that a list of 3D joint coordinates has already been generated for at least the characteristic frames of the reference frame sequence for the respective identified joints of the trainer's 3D skeleton by using any of the earlier cited methods. The 3D skeleton for each frame J is then projected to points on a virtual spherical surface 203*s*. As typically only the upper half of a spherical surface is of relevance, spherical surfaces are also referred to as walls of virtual domes in the following. Projection functions are:

$$\Pi_1 = \Pi_1(r_1, \phi_1, \theta_1)$$

$$\Pi_2 = \Pi_2(r_2, \phi_2, \theta_2)$$

$$\vdots$$

$$\Pi_k = \Pi_k(r_k, \phi_k, \theta_k)$$

$$\vdots$$

Next, intervals with corresponding interval values are defined for r, ϕ, θ. An example definition with appropriate interval values is given in the following:

r:$r_{min}$=2 m, $r_{max}$=10 m, Δr=0.1 m ⇒$r_k$∈[2, 2.1, 2.2, . . . , 9.8, 9.9, 10.0]

ϕ:$\phi_{min}$=0°, $\phi_{max}$=360°, Δϕ=1° ⇒$\phi_k$∈[0°, 1°, 2°, . . . , 177°, . . . , 360°]

θ:$\theta_{min}$=0°, $\theta_{max}$32 180°, Δθ=1°⇒$\theta_k$∈[0°, 1°, 2°, . . . , 90°, . . . , 180°]

A person skilled in the art may select other deltas between the r-, ϕ-, θ-interval values if appropriate. The delta for the respective coordinate values determines the resolution provided by the virtual domes for pose matching under arbitrary viewing angle situations and variable distances between user and camera. It is to be noted that the r-coordinate corresponds to the distance between the user and the camera. In the above xample, the r-coordinate ranges from 2 m to 10 m with a resolution (delta) of 0.1 m. The projection on the virtual dome with r=10 m is smaller than the projection of the virtual dome with r=2 m. For the pose matching to work properly, the real distance is actually of no importance because it is sufficient to find one 2D skeleton projection on any one of the virtual domes (i.e., the concentric spheres) which matches the size of the 2D skeleton identified in the test frame sequence.

The polar angle θ specifies the angle between the north pole (θ=0) of the spherical surface (corresponding to a camera view from the top) and the actual position of a particular projection on the respective sphere. That is, θ=180° corresponds to the south pole and reflects a camera view from beneath the user. 0=90° corresponds to a height of the camera which is positioned at the same height as the pelvis of the user. In a realistic camera setup scenario, a realistic range of the 0-interval values is typically well covered with the interval θ ∈ [45°, 46°, . . . , 90, . . . , 135°].

The following pseudo-code illustrates an example algorithm for the projection:

```
N = number_of_frames
r_list = [2, ..., 10.0]
phi_list = [0, ..., 360.0]
theta_list = [0, ..., 180]
frames_list = [1, ..., N]
skeleton_3d_list = [skel_1, ..., skel_N]
# empty list to append projected 2d skeletons to
skeleton_2d_list = [ ]
for f in frames_list :
  for r_k in r_list :
    for phi_k in phi_list :
      for theta_k in theta_list :
        # take the frame f 3d skeleton
        skel_f = skeleton_3d_list [ f ]
        # project via a projection function
        projected_skel_2d = projection_function (skel_f ,
          r_k,
          phi_k,
          theta_k)
# save the skeleton 2d list to pose file in hierarchical form
skeleton_2d_list -> pose_file
```

The pose data file (pose-file) can be saved in an appropriate hierarchical format (e.g., json, xml, . . . ) and contains the projected 2D skeletons (reference pose images) for all frames of the reference frame sequence, and all projections in accordance with the predefined interval values (i.e., the projections to all projection points on the concentric spheres 203*s* as defined by the respective interval values of the coordinates r, ϕ, θ), as follows:

$$\{\underbrace{1}_{\text{frame number}} : \{\text{projection\_1}: \{\underbrace{x_1, x_1}_{\text{joint } 1}, \underbrace{x_2, y_2}_{\text{joint } 2}, \ldots, \underbrace{x_J, y_J}_{\text{joint } J}\}, \ldots,$$

$$\text{projection\_k}: \{\underbrace{x_1, x_1}_{\text{joint } 1}, \underbrace{x_2, y_2}_{\text{joint } 2}, \ldots, \underbrace{x_J, y_J}_{\text{joint } J}\}, \ldots,$$

$$\underbrace{100}_{\text{frame number}} : \{\text{projection\_1}: \{\underbrace{x_1, y_1}_{\text{joint } 1}, \underbrace{x_2, y_2}_{\text{joint } 2}, \ldots, \underbrace{x_J, y_J}_{\text{joint } J}\}, \ldots,$$

$$\text{projection\_k}: \{\underbrace{x_1, y_1}_{\text{joint } 1}, \underbrace{x_2, y_2}_{\text{joint } 2}, \ldots, \underbrace{x_J, y_J}_{\text{joint } J}\}, \ldots,$$

$$\underbrace{N}_{\text{frame number}} : \{\text{projection\_1}: \{\underbrace{x_1, y_1}_{\text{joint } 1}, \underbrace{x_2, y_2}_{\text{joint } 2}, \ldots, \underbrace{x_J, y_J}_{\text{joint } J}\}, \ldots,$$

$$\text{projection\_k}: \{\underbrace{x_1, y_1}_{\text{joint } 1}, \underbrace{x_2, y_2}_{\text{joint } 2}, \ldots, \underbrace{x_J, y_J}_{\text{joint } J}\}$$

In other words, the received pose data file 203 includes a 2D skeleton projection for each point on the surfaces of all concentric spheres in accordance with the resolution as defined by the r-, ϕ-, and θ-interval values.

Figure 1C:
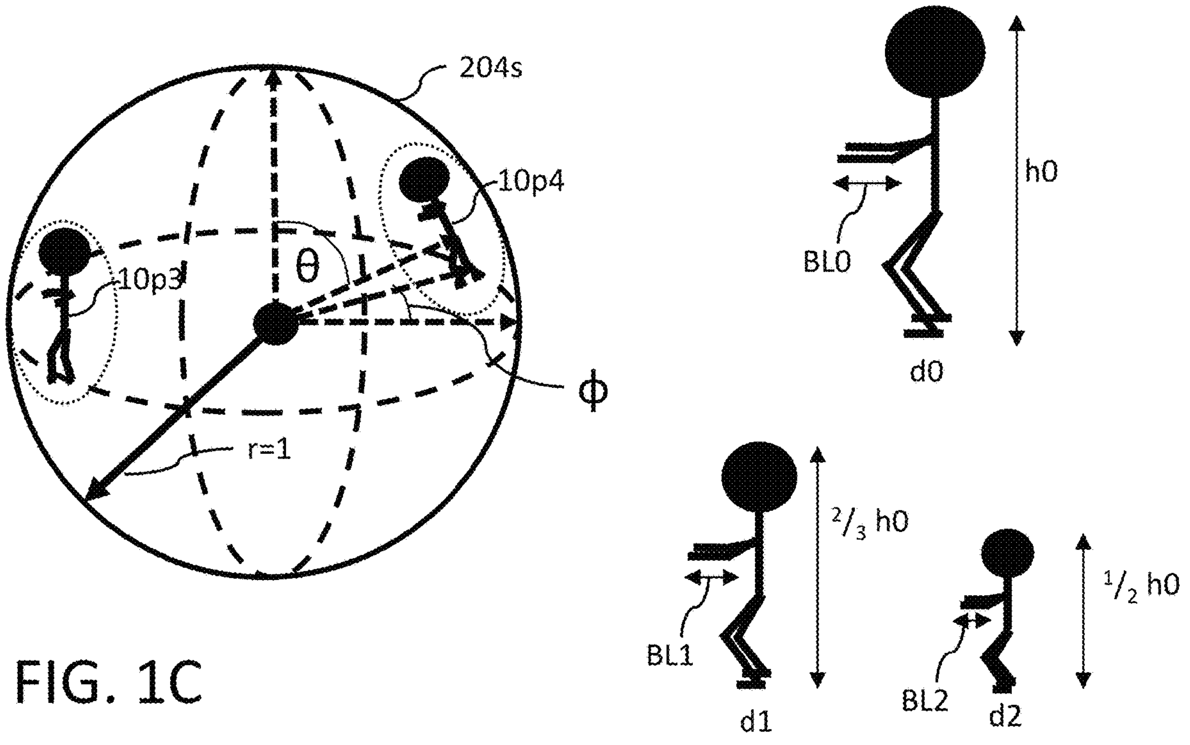
FIG. 1C illustrates a single normalized spherical surface for 2D skeleton projection according to an embodiment.

Turning now to FIG. 1C, an alternative implementation of the virtual dome is illustrated. This alternative implementation only uses a single spherical surface 204*s* with normalized 2D skeleton projections 10*p*3, 10*p*4. In this implementation, a single spherical surface 204*s* is used for generating normalized 2D skeleton projections 10*p*3, 10*p*4. In this implementation, the r-dimension is fixed (r=1). Only the ϕ- and θ-angles determine the position of a respective 2D skeleton projection. This is achieved by normalizing the respective projected 2D skeletons. To the right of FIG. 1C, the original height h0 of the user is shown. This corresponds to a zero distance d0 between the user and the camera. The various bone lengths between respective joints of the user (e.g., the bone length BL0 between the user's left hand and left elbow) scale at the same factor as the overall height of the user in a particular frame when generating projections for a range of distances. That is, for 2D projections of the user at distance d1, where the projected height of the user corresponds to ⅔ h0, the bone length BL1 also corresponds to ⅔ h0. Similarly, at a distance d2, where the projected height of the user corresponds to ½ h0, the bone length BL2 corresponds to ½ h0. That is, when normalizing each bone length in a projection with the respective projected user height, the same normalized 2D skeleton projection results for any distance. This normalized projection is then projected to the sphere 204*s* with r=1.

A pose matching module 120 of system 100 then selects 1400 a particular two-dimensional skeleton projection 10*p*1 of the first human with the minimum mathematical distance to the two-dimensional skeleton 20 of the second human in the current test frame Fc. In other words, the pose matching module compares the 2D skeleton of the current test frame Fc with the 2D projections on the concentric spherical surfaces by computing the respective mathematical distance between the 2D skeleton and the available 2D skeleton projections. The 2D skeleton projection which has the minimum distance to the 2D skeleton of the current test frame is then selected by the pose matching module. The selected 2D projection corresponds to a reference pose image of the pose data file which is the best match with the current pose of the second human 2 in the current test frame Fc. That is, the selected 2D projection represents a reference pose image at a viewing angle which corresponds to the particular viewing angle of the camera device 200 versus the user 2, and at a distance which corresponds to the particular distance between the camera device 200 and the user 2. In case the multi-sphere implementation is used, the pose matching module can directly use the output of the skeleton detector 110 (the identified 2D skeleton) for the comparison with the available 2D skeleton projections. In case the normalized sphere implementation is used, the pose matching module 120 has a normalization function which normalizes the identified 2D skeleton received from the skeleton detector before comparing with the available 2D skeleton projections. That is, each bone length of the 2D skeleton 20 is divided by the user's height in the respective frame Fc.

Once the right 2D projection has been selected, the frame sequence of the selected 2D projection 10*p*1 can be used as reference frame sequence for a forthcoming comparison of the exercise actually performed by the user 2 with the exercise demonstrated by the trainer in the reference video. The selected reference frame sequence stays valid as long as the user does not significantly change its position in relation to camera 200. However, even if the user 2 would change the position, for example by moving closer to a screen showing the trainer video, system 100 can adapt automatically to the new position of the user by simply selecting another reference frame sequence with 2D projections matching the new position of the user 2. It is to be noted that the pose matching module 120 can select the matching reference pose image in near-real-time by applying an appropriate algorithm for computing the mathematical distances between the 2D projections and the current 2D user skeleton. Examples of such algorithms are known in the art and described in detail, for example, in the following publications. In "Dynamic vp-tree indexing for n-nearest neighbor search given pair-wise distances" by Ada Wai-chee Fu et al., The VLDB Journal (2000) 9: 154-173, a distance-based indexing method is proposed which can be applied to compute the distances between corresponding joints in the 2D skeleton of the current frame and the respective 2D skeleton projections. Alternative methods for the mathematical distance computation are described by Kumar N., Zhang L., Nayar S. (2008) in "What Is a Good Nearest Neighbors Algorithm for Finding Similar Patches in Images?", in: Forsyth D., Torr P., Zisserman A. (eds) Computer Vision—ECCV 2008. ECCV 2008, Lecture Notes in Computer Science, vol 5303. Springer, Berlin, Heidelberg.

FIG. 7 illustrates an embodiment of the pose matching module 120 where the selection of the appropriate 2D projection 10*p*1 with the minimum mathematical distance to the identified 2D skeleton 20 is made by a correspondingly trained neural network (NN) 122. NN 122 receives the 2D skeleton 20 (or the normalized skeleton) of the current frame Fc as a representation of the user's current pose as input. NN 122 has been trained to predict the (r, ϕ, θ) vector associated with the current pose. In other words, NN 122 predicts the coordinates of the center of the 2D skeleton projection which reflects the viewing angle at which the test frame sequence is obtained. As described earlier, dependent on the implementation of the pose data file (multiple concentric spheres or single normalized sphere), the pose matcher 120 may also include a normalizing function 121 to compute a normalized identified 2D skeleton in case a single normalized sphere is used for the 2D skeleton projections.

For example, NN 122 may be implemented by a standard multilayer perceptron with a relatively small topology including 3 to 6 layers with each layer having 50 to 100 neurons. The input layer IL is configured to receive the detected 2D skeleton (or the normalized 2D skeleton) as a test input. The output layer is configured to provide a prediction of the viewing perspective (r, ϕ, θ) associated with the test input. A person skilled in the art may also use other appropriate NN topologies. NN 122 can be trained as described earlier to be enabled to make the selection 1400 in near-real-time. A basic training dataset includes a set of videos showing users in different poses while doing exercises. The 2D projection algorithm is then applied to such videos to produce corresponding 2D skeleton projections for each characteristic frame. For each pose projection the vector with the respective polar coordinates (r, ϕ, θ) is thereby known and can now be used as label for the respective 2D projection. The neural network is then trained with the 2D skeleton projections as input to predict the (r, ϕ, θ) vector for any 2D pose, wherein the respective labels provide the ground truth for the training.

Once the neural network is sufficiently trained, it can predict, in near-real-time, the (r, ϕ, θ) vector which corresponds to any 2D skeleton identified by the real-time 2D skeleton detector. The predicted (r, ϕ, θ) vector points directly to the 2D skeleton projection of the reference video stream which is estimated (by NN 122) to have the minimum mathematical distance to the pose in the current test frame Fc. In other words, the neural network selects in real-time the 2D projection at a viewing angle which comes closest to the viewing angle between the user and the camera obtaining the test frame sequence. This embodiment is also advantageous in that it can immediately adapt automatically to any position change of the user while performing the exercise. The neural network immediately selects the 2D projections of the reference video stream which provide the best match with the current pose at a changed location or viewing perspective (e.g., when the user just slightly changes the orientation towards the camera).

FIG. 8 illustrates an approach for optional data augmentation of the training dataset which leads to an improved accuracy in the prediction of the view perspective ((r, ϕ, θ) vector) by NN 122. For poses in the basic training dataset, the data augmentation includes to generate additional pose images by manipulating the body skeleton proportions. In the example, it is assumed that the original 3D skeleton 8 of the person in the video is part of the basic training dataset reflecting the person's body skeleton proportions SP1. The data augmentation function can now create for each frame (where this person is shown) additional 3D skeletons from this original 3D skeleton 8 by scaling up and down specific body parts. In the example, a generated artificial 3D person skeleton 8' is shown with skeleton proportions SP2 with shorter arms, longer legs and a shorter mid body than the original SP1 of the real person. A further generated artificial 3D person skeleton 8" is shown with skeleton proportions SP3 with shorter arms, shorter legs and a longer mid body than the original SP1 of the real person. When applying such modifications of the body proportions to all frames of a video with a particular person, additional training video data is generated with artificial persons. For each of those artificial persons, again 2D skeleton projections on the virtual dome are computed. By using the additionally generated 2D skeleton projections as training data for the training of NN 122, the accuracy of the view prediction achieved by NN 120 is improved.

Turning back to FIG. 1, in one embodiment, system 100 supports a display function. A visualizer function may be used to render a frame Fc' including the current test frame Fc and a representation of the corresponding two-dimensional skeleton 20 of the second human in near-real-time, and to visualize 1450 the rendering result Fc' to the user 2 via an appropriate display. In a typical setup, the trainer video stream from which the reference frame sequence was generated would be presented to the user such that the user 2 can watch at the same time his/her own exercising in the rendered result, thus being enabled to compare his/her own movements with the movements of the trainer. However, it is difficult for a user without medical knowledge to assess whether the exercise is correctly performed or not.

To support the user in this regard, in one embodiment, system 100 may have a pose checking module 130. The pose checking module 130 determines 1500*a* (mathematical) distance of the current pose from the corresponding reference pose, wherein this distance is a measure indicating whether the second human is correctly performing the physical exercise. The distance between the 2D skeleton of the current test frame and the corresponding selected 2D skeleton projection of the reference frame sequence can be computed using the same algorithms as for computing the above minimum distance for selecting the matching reference pose image. In case the physical exercise is not correctly performed (e.g., the distance between the current pose and the reference pose exceeds a predefined threshold), the system indicates to the user 2 pose correction feedback 10*pf* on how to correct the current pose. In FIG. 1A, the pose correction feedback is represented by a little arrow as a graphical element merged into the rendered output Fc'. However, also other modalities may be used for the pose correction feedback as described in the following.

In one embodiment, the pose data file includes annotations for each frame grouping subsets of joints to corresponding body parts. Referring briefly to FIG. 3, for example the group of joints j7, j10 and j12 may be annotated as "right arm". Joint 10 may additionally be annotated as "right elbow" and joint j12 as "right hand". Joints j15, j16, j18 and j20 may be grouped into "right leg". Joints j18, j20 may be grouped into "right foot" being a sub-group of "right leg". Joint j16 may additionally be annotated as "right knee", and so on. That is, there can be hierarchical relationship between groups of body parts in cases where a body part has sub-parts (sub-groups), wherein such a sub-group may only include a single joint.

Using such annotations, the pose checking module 130 can indicate body parts which exceed a predefined critical distance for the current test frame. For example, if the knee or elbow for a particular pose shows a significant deviation from a corresponding reference pose, respective feedback is provided with regard to the indicated body parts on how to change the current pose until the current distance for said body parts falls below the critical distance.

FIG. 5B shows two screen shots 520*ou*, 520*od* of two rendered output frames with the respective current frame showing the user 3 while performing two example poses of an exercise demonstrated by the trainer in FIG. 5A in the references frames 510*ru*, 510*rd*. In the first output frame 520*ou* the user raises the right arm in accordance with a respective pose "Reach Up". Further, the 2D skeleton of the user 3 is visualized in the output frame 520*ou* via white bullets representing the user's joints and white connection lines as a simplified representation of the user's bones as an overlay. The output frame may provide further information such as the pose name 520*pn* and the feedback 520*fb* to the user for indicating whether the exercise is executed correctly. It is to be noted that in the output frames 520*ou*, 520*od* it appears as if the user 3 would perform the exercise by raising the left knee and lowering the right elbow. However, this impression is caused by the fact that the frame sequence showing the user 3 was actually captured by a selfie-camera of a smartphone leading to a mirror effect in the video stream. Indeed, the user 3 performed the exercise with the right knee/elbow in accordance with the reference frame sequence. A person of skill in the art can harmonize the views by accommodating mirror effects accordingly.

The feedback 520*fb* provided in the example for both poses is "Well done!". In these examples, the user has performed the exercise in accordance with the demonstrated exercise within a predefined tolerance range (i.e., the computed distances from the reference poses did not exceed the predefined critical distance for any of the user's 3 body parts. The critical distance may be customizable by the user to account for particular user properties, such as for example, the user's age, the degree of mobility limitations (e.g., due to some previous surgery of other limitations), etc. The modality for the feedback output in this example is a written text message on the display which assumes that the display is large enough for the feedback message 520*fb* to be readable by the user 3. For example, the output 520*ou* may be projected to a TV screen or the like.

FIG. 5C illustrates a screen shot of an output frame 520*oc* with a correction feedback 520*pf*1 "Improve RIGHT-KNEE". In this example, the right knee of the user is positioned too low so that the position of the user's 2D skeleton has a distance from the corresponding annotated joint of the respective 2D skeleton projection which exceeds the predefined critical distance. From the sign of the distance the pose checking module can derive whether the deviation corresponds to a position which is too low or too high and generate the corresponding correction feedback.

In the example of FIG. 5C, the right foot of the user 3 is of course also too low compared to respective reference pose. Further, the right elbow of the user is still too high. The system might therefore also generate correction feedback such as "Raise right foot" or "Lower right elbow". For example, "Raise right foot" might however mislead the user to stretch the right leg instead of raising the knee. Therefore, the pose data file may include further annotations for each reference frame with different priorities for respective body parts in the context of an exercise. An example of such priority annotations is given in FIG. 5D. For example, for the reference pose of frame 510*rd*, the highest priority P10 may be given to the right knee, the second highest priority P9 on the right elbow and lower priorities P8 can be assigned to the right hand and right foot. The corresponding body parts on the left side of the trainer are not considered to be relevant for the execution of this exercise. Therefore, priority P0 (i.e., no priority) is used as priority annotation for these body parts of the trainer. In the example of FIG. 5C, the system has been customized to provide only correction feedback for body parts with the highest priority P10. In case correction feedback is also provided for priority P9 body parts, the system would further create a correction feedback with regard to the right elbow (e.g., "lower your right elbow"). Instead of using priority values (e.g., P0 to P10) for priority annotation of body parts, the body parts may be organized in a hierarchy with the root node indicating the body part with the highest priority and each body part parent node having a higher priority than its child nodes.

In other words, to generate the most appropriate correction feedback to the user, the pose checker can use the priority annotation in or associated with the pose data file to select the correction feedback associated with the body part having the highest priority for the currently performed exercise. In the example it is assumed that the position of the right knee is most critical for performing the correct pose and, therefore, the selected correction feedback 520*pf*1 relates to the right knee. The priority annotation reflects which body parts are important for a particular exercise and which are of less importance. For example, for a squat exercise the priority annotation may indicate that the position of the knee is most important for evaluating the correctness of the exercise execution whereas the position of the arms may be annotated as of no importance. In this case, a positive feedback would be given even if the arms were not moved in accordance with the reference frame sequence. For example, in the reference video the trainer may hold the arms in a straight horizontal position whereas the user may fold his/her arms behind the head or may simply let the arms hang down. In all cases no correction feedback would be given if the arms are annotated with low priority for the exercise. If, however, the straight horizontal position of the arms would be considered as crucial for correct performance of the exercise, they may be annotated with a similar priority as the knees and any negative evaluation of the arm movement would equally lead to a correction feedback to the user.

FIGS. 6A. 6B illustrate a scenario where deviations in the exercise execution from the reference frame sequence 610*ru*, 610*rd* do not result in a correction feedback because the deviating body parts are not annotated as being relevant for achieving the desired treatment effect when performing the exercise. In the example, the trainer in the reference frame sequence 610*ru*, 610*rd* places his left hand on his left breast in both poses whereas the user 3 has performed both poses with the left arm hanging down. However, left hand and left elbow were annotated with a "no relevance" priority annotation for this exercise 620*pn*. Therefore, in both cases, positive feedback 620*fb* is provided to the user to indicate that no correction is required for improving the poses performed by the user 3. The system 100 can use different modalities to communicate the correction feedback to the user 3. As already described above, a simple text message 520*pf*1 can be merged into the respective output frame 520*oc*. Alternatively, the pose checker 130 can merge a graphical object 520*pf*2 into the rendered output. In the example, the right knee was identified as the most relevant body part to be corrected in that it needs to be lifted higher. For example, an arrow is starting at the respective joint and pointing into the direction of the desirable correction is used as such a graphical feedback object. In another embodiment, the system can output a voice instruction 520*pf*3 as correction feedback via a loudspeaker communicatively coupled with the system 100. The voice instructions may be the same as the text message, or it may differ from said text message. It is to be noted that the various feedback modes using multiple modalities may be combined. For example, the graphical object 520*pf*2 may be displayed and, at the same, the voice instruction 520*pf*3 may be issued. The user may also customize system 100 in selecting the combination of correction feedback modalities which is most appropriate to the user. For example, a visually impaired person may only be interest in the voice output whereas a hearing-impaired person may only be interested in visual correction feedback.

FIG. 9 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Ideally, device 900 has a GPU adapted to process machine learning algorithms. Generic computer device 900 may correspond to the computer system 100 of FIG. 1A. Computing device 950 is intended to represent various forms of mobile devices, such as personal digital assistants, cellular telephones, smart phones, and other similar computing devices. For example, computing device 950 may be used as a GUI frontend for a user to capture test input images and provide them to the computer device 900, and in turn, receive from the computer device, the predicted PDCU value. The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the description.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method for matching a test frame sequence with a reference frame sequence, the reference frame sequence demonstrating a physical exercise performed by a first human, the method comprising:

receiving a pose data file representing, for at least a subset of frames of the reference frame sequence, based on a list of three-dimensional joint coordinates representing positions of a plurality of joints of a three-dimensional skeleton of the first human in a respective frame of the subset of frames of the reference frame sequence, a plurality of two-dimensional skeleton projections onto a virtual spherical surface with a particular joint of the three-dimensional skeleton at the geometric center of the spherical surface, wherein each two-dimensional skeleton projection for a particular frame of the subset corresponds to a two-dimensional reference pose image of the three-dimensional skeleton of the first human from a different viewing angle, with the two-dimensional reference pose image being a characteristic pose of the physical exercise;

receiving the test frame sequence representing movements of a second human while imitating the physical exercise, the test frame sequence captured at a particular angle by a camera device;

detecting, with a real-time two-dimensional skeleton detector, a two-dimensional skeleton of the second human in a current test frame of the test frame sequence, wherein the two-dimensional skeleton of the second human is a two-dimensional representation of the pose of the second human in the respective test frame; and selecting a particular two-dimensional skeleton projection of the first human with the minimum mathematical distance from the two-dimensional skeleton of the second human in the current test frame to match the current pose of the second human in the current test frame with a corresponding reference pose representation in the pose data file, the particular two-dimensional skeleton projection representing the corresponding reference pose at a viewing angle which corresponds to the particular angle of the camera device, wherein selecting the particular two-dimensional skeleton projection of the first human further includes:

providing the two-dimensional skeleton of the second human in the current test frame to a neural network to predict a viewing perspective associated with the current test frame, the neural network trained with a plurality of training frames showing user poses while performing exercises as input, with each training frame being annotated with a corresponding viewing perspective as ground truth; and selecting the particular two-dimensional skeleton projection of the first human which is located at sphere coordinates that correspond to the predicted viewing perspective.

2. The method of claim 1, further comprising:

visualizing to the second human the current test frame including a representation of the corresponding two-dimensional skeleton of the second human in near-real-time.

3. The method of claim 1, further comprising:

determining a mathematical distance of the current pose from the corresponding reference pose, wherein the distance is a measure indicating whether the second human is correctly performing the physical exercise; and in case the physical exercise is not correctly performed, indicating to the second human pose correction feedback on how to correct the current pose.

4. The method of claim 3, wherein the pose data file includes annotations for each frame grouping subsets of joints to corresponding body parts, the method further comprising:

indicating body parts which exceed a predefined critical distance for the current test frame; and proving feedback with regard to the indicated body parts on how to change the current pose until the current distance for said body parts falls below the critical distance.

5. The method of claim 3, wherein the pose correction feedback is output to the second human as visual information or sound information.

6. The method of claim 1, wherein selecting the particular two-dimensional skeleton projection further comprises:

identifying the corresponding reference pose image by selecting a subgroup of potential corresponding reference pose images.

7. A computer system for matching a test frame sequence with a reference frame sequence, the reference frame sequence demonstrating a physical exercise performed by a first human, the system comprising:

an interface configured to receive a pose data file representing for at least a subset of frames of the reference frame sequence, based on a list of three-dimensional joint coordinates representing positions of a plurality of joints of a three-dimensional skeleton of the first human in a respective frame of the subset of frames of the reference frame sequence, a plurality of two-dimensional skeleton projections on a virtual spherical surface with a particular joint of the three-dimensional skeleton at the geometric center of the spherical surface, wherein each two-dimensional skeleton projection on the spherical surface for a particular frame of the subset corresponds to a two-dimensional reference pose image of the three-dimensional skeleton of the first human from a different viewing angle, with the two-dimensional reference pose image being a characteristic pose of the physical exercise, and further configured to receive the test frame sequence representing movements of a second human while imitating the physical exercise, the test frame sequence captured at a particular angle by a camera device;

a real-time two-dimensional skeleton detector module configured to detect a two-dimensional skeleton of the second human in a current test frame of the test frame sequence, wherein the two-dimensional skeleton of the second human is a two-dimensional representation of the pose of the second human in the respective test frame; and a pose matching module configured to select a particular two-dimensional skeleton projection of the first human with the minimum mathematical distance from the two-dimensional skeleton of the second human in the current test frame to match the current pose of the second human in the current test frame with a corresponding reference pose representation of the pose data file, the particular two-dimensional skeleton projection representing the corresponding reference pose at a viewing angle which corresponds to the particular angle of the camera device, wherein the pose matching module includes:

a neural network with an input layer (IL) to receive a representation of the two-dimensional skeleton as a test input, and an output layer (OL) to predict a viewing perspective associated with the received test input, the neural network trained with a plurality of training frames showing user poses while performing exercises as input, with each training frame being annotated with a corresponding viewing perspective as ground truth, wherein the predicted viewing perspective represents a pointer to the particular two-dimensional skeleton projection of the first human to be selected.

8. The system of claim 7, further comprising:

a visualizer function configured to visualize to the second human the current test frame including a representation of the corresponding two-dimensional skeleton of the second human in near-real-time.

9. The system of claim 7, further comprising a pose checking module configured to:

determine a mathematical distance of the current pose to the corresponding reference pose, wherein the mathematical distance is a measure indicating whether the second human is correctly performing the physical exercise; and in case the physical exercise is not correctly performed, to indicate to the second human pose correction feedback on how to correct the current pose.

10. The system of claim 7, wherein the pose data file includes annotations for each frame grouping subsets of joints to corresponding body parts, the pose matching module further configured to:

indicate body parts which exceed a predefined critical distance for the current test frame; and provide feedback with regard to the indicated body parts on how to change the current pose until the current distance for said body parts falls below the critical distance.

11. The system of claim 7, wherein the pose matching module further comprises a normalizer function configured to transform the detected 2D skeleton into a normalized two-dimensional skeleton in that each bone length of the detected 2D skeleton is divided by the height of the two-dimensional skeleton.

12. The system of claim 7, wherein the virtual spherical surface is normalized with a radius equal to one, with each two-dimensional skeleton projection being a normalized two-dimensional representation of the three-dimensional skeleton from a different viewing angle.

13. A non-transitory computer program product for matching a test frame sequence with a reference frame sequence, the reference frame sequence demonstrating a physical exercise performed by a first human, wherein the computer program product, when loaded into a memory of a computing device and executed by at least one processor of the computing device, causes the at least one processor to:

receive a pose data file representing for at least a subset of frames of the reference frame sequence, based on a list of three-dimensional joint coordinates representing positions of a plurality of joints of a three-dimensional skeleton of the first human in a respective frame of the subset of frames of the reference frame sequence, a plurality of two-dimensional skeleton projections onto a virtual spherical surface with a particular joint of the three-dimensional skeleton at the geometric center of the spherical surface, wherein each two-dimensional skeleton projection for a particular frame of the subset corresponds to a two-dimensional reference pose image of the three-dimensional skeleton of the first human from a different viewing angle, with the two-dimensional reference pose image being a characteristic pose of the physical exercise;

receive the test frame sequence representing movements of a second human while imitating the physical exercise, the test frame sequence captured at a particular angle by a camera device;

detect, with a real-time two-dimensional skeleton detector, a two-dimensional skeleton of the second human in a current test frame of the test frame sequence, wherein the two-dimensional skeleton of the second human is a two-dimensional representation of the pose of the second human in the respective test frame; and select a particular two-dimensional skeleton projection of the first human with the minimum mathematical distance from the two-dimensional skeleton of the second human in the current test frame to match the current pose of the second human in the current test frame with a corresponding reference pose representation in the pose data file, the particular two-dimensional skeleton projection representing the corresponding reference pose at a viewing angle which corresponds to the particular angle of the camera device, wherein selecting the particular two-dimensional skeleton projection of the first human includes:

providing the two-dimensional skeleton of the second human in the current test frame to a neural network to predict a viewing perspective associated with the current test frame, the neural network trained with a plurality of training frames showing user poses while performing exercises as input, with each training frame being annotated with a corresponding viewing perspective as ground truth; and selecting the particular two-dimensional skeleton projection of the first human which is located at sphere coordinates that correspond to the predicted viewing perspective.

14. The non-transitory computer program product of claim 13, wherein the computer program product, when loaded into the memory of the computing device and executed by the at least one processor of the computing device, causes the at least one processor to:

visualize to the second human the current test frame including a representation of the corresponding two-dimensional skeleton of the second human in near-real-time.

15. The non-transitory computer program product of claim 13, wherein the computer program product, when loaded into the memory of the computing device and executed by the at least one processor of the computing device, causes the at least one processor to:

determine a mathematical distance of the current pose from the corresponding reference pose, wherein the distance is a measure indicating whether the second human is correctly performing the physical exercise; and in case the physical exercise is not correctly performed, indicate to the second human pose correction feedback on how to correct the current pose.

16. The non-transitory computer program product of claim 13, wherein the computer program product, when loaded into the memory of the computing device and executed by the at least one processor of the computing device, causes the at least one processor to select the two-dimensional skeleton projection including identifying the corresponding reference pose image by selecting a subgroup of potential corresponding reference pose images.

* * * * *